United States Patent
Wang

(10) Patent No.: US 7,454,418 B1
(45) Date of Patent: Nov. 18, 2008

(54) FAST SIGNATURE SCAN

(76) Inventor: Qiang Wang, 92 Churchill Ave., Palo Alto, CA (US) 94306

( * ) Notice: Subject to any disclaimer, the term of this patent is extended or adjusted under 35 U.S.C. 154(b) by 488 days.

(21) Appl. No.: 10/982,057

(22) Filed: Nov. 5, 2004

Related U.S. Application Data

(60) Provisional application No. 60/518,032, filed on Nov. 7, 2003.

(51) Int. Cl.
*G06F 7/00* (2006.01)
*G06F 17/00* (2006.01)
(52) U.S. Cl. ............................................. 707/6; 726/25
(58) Field of Classification Search .................... 707/3, 707/6; 726/25
See application file for complete search history.

(56) References Cited

U.S. PATENT DOCUMENTS

| | | | | |
|---|---|---|---|---|
| 5,452,442 | A * | 9/1995 | Kephart | 714/38 |
| 5,623,600 | A | 4/1997 | Ji et al. | |
| 5,778,395 | A * | 7/1998 | Whiting et al. | 707/204 |
| 2003/0021419 | A1* | 1/2003 | Hansen et al. | 380/277 |
| 2004/0117037 | A1* | 6/2004 | Hinshaw et al. | 700/2 |
| 2005/0086520 | A1 | 4/2005 | Dharmapurikar et al. | |

OTHER PUBLICATIONS

Bloom, "Space/Time Trade-offs in Hash Coding with Allowable Error", *Communications of the ACM*, vol. 13, No. 7, pp. 422-426, 1970.

Ramakrishna et al., "A Performance Study of Hashing Functions for Hardware Applications", *Proc. ICCI'94 International Conference on Computing and Information*, pp. 1621-1636, 1994.
Boyer et al., "A Fast String Searching Algorithm", *Communications of the ACM*, vol. 20, No. 10, pp. 762-772, 1977.
Karp et al., "Efficient Randomized Pattern-Matching Algorithms", *IBM J. Res. Develop.*, vol. 31, No. 2, pp. 249-260, 1987.
Wu et al., "Fast Text Searching with Errors", *Communications of the ACM*, vol. 35, pp. 83-91, 1992.
Wu et al., "A Fast Algorithm for Multi-Pattern Searching" research paper, pp. 1-11, 1994.
Hutchings et al., "Assisting Network Intrusion Detection with Reconfigurable Hardware", *Proceedings of the ICEE FCCM'02*, 2002.
Sidhu et al., "Fast Regular Expression Matching Using FPGAs", *Proceedings of IEEE FCCM*, 2001.
Cho et al., "A Fast Regular Expression Indexing Engine", *In Proceedings of ICDE*, 2002.
Dharmapurikar et al., "Deep Packet Inspection Using Parallel Bloom Filters", *Symposium on High Performance Interconnects*, pp. 44-51, 2003.
Lockwood et al., "An Extensible, System-on-Programmable-Chip, Content Aware Internet Firewall", *MAPLD*, 2003.

* cited by examiner

*Primary Examiner*—Wilson Lee
*Assistant Examiner*—Alex Gofman
(74) *Attorney, Agent, or Firm*—Fish & Richardson P.C.

(57) ABSTRACT

Systems and methods for scanning signatures in a string field. In one implementation, the invention provides a method for string signature scanning. The method includes processing one or more signatures into one or more formats, receiving a string field, translating the string field into one of the one or more formats of a signature database, identifying any string signatures included in the string field including scanning the string field for one or more fingerprints associated with string signatures, and outputting any identified string signatures.

57 Claims, 13 Drawing Sheets

{HASH VAL0, HASH VAL1, ..., HASH VALI}
= {{HASH VAL0A, HASH VAL0B}, HASH VAL1, ..., HASH VALI}

WHEN TYPE = 0, SID = STRING ID - 364
WHEN TYPE = 1, SID = SIGNATURE ID - 366

FAST SIGNATURE SCAN

CROSS-REFERENCE TO RELATED APPLICATIONS

This application is a claims priority to U.S. Provisional Patent Application Ser. No. 60/518,032, which was filed on Nov. 7, 2003. The disclosure of the above application is incorporated herein by reference in its entirety.

BACKGROUND

The present specification relates to scanning signatures in a string field.

A data structure can include one or more string fields. A string field is a string of data values that typically stand for characters or execution codes. For example an IP packet can include URL, HOST, HTTP header, HTTP payload, email attachments, email header, and email payload fields. The size of a string field can vary from a few bytes to a few million bytes or more. A string signature is a particular sequence of data values identifying data in a string. String signatures can be stored in a string signature database. The string signature database can include a plurality of string signatures. The size of a single string signature can vary from a few bytes to tens of thousands of bytes.

Both string signatures and string field are bit strings that can include many basic units. A basic unit is a smallest unit having a semantic meaning, and is therefore used as a scanning unit in conventional string signature scan techniques. A size of the basic unit can vary with application. For example, a basic unit of English text strings is typically 8 bits (i.e., one byte) while a basic unit of a computer virus signature is typically a byte or a half byte.

Each basic unit in a particular string signature can be specified as equal or unequal to a specific value, or a range of values (e.g., a numerical character or an alphabetic character can have a specific value or a range of values such as 0-9 or a-z). The basic unit can be specified to be either case-sensitive or case-insensitive. The string signature can support simple logic operations (e.g., negation). Furthermore, each string signature can include a wildcard designated by, for example, a "*" (a "variable" symbol) or "?" (a fixed symbol), where "*" indicates zero or more arbitrary basic units and "?" indicates a single arbitrary basic unit. For each variable symbol, a range of arbitrary basic units can be further specified. When a string signature includes the variable symbol, the size of the string signature is variable. If the string signature does not include a variable symbol, the size of the string signature is fixed.

A typical signature scan process can include comparing a string field against corresponding string signatures in a database for all possible locations within the string field. The scan speed is typically limited by signature size and complexity. In addition, scan speed can be limited by the ability to update the signatures concurrently.

SUMMARY

Systems and methods for scanning signatures in a string field. In general, in one aspect, the invention features a method for string signature scanning. The method includes processing one or more signatures into one or more formats, receiving a string field, translating the string field into one of the one or more formats of a signature database, identifying any string signatures included in the string field including scanning the string field for one or more fingerprints associated with string signatures, and outputting any identified string signatures.

Implementations can include one or more of the following features. Scanning the string field can further include identifying a match between a fingerprint and an associated string signature, determining if the associated signature corresponds to a fixed-size signature or a fixed-size signature substring of a variable-size signature, and synthesizing fixed-size signature substrings of a variable-size signature to identify a variable-sized signature. The processing of one or more string fields can further include decomposing, translating, and encoding.

The method of string signature scanning can further include translating a string field and one or more associated string signatures into one or more shadow spaces, scanning the string field in the shadow spaces for one or more fingerprints, and verifying the scanning results in an original space. The method can further include selecting one or more shadow spaces and translating one or more fingerprints into the one or more of the selected shadow spaces for scanning. Translating the string field can further include normalizing the string field, including decompressing the string field if the string filed is in a compressed format, decoding the string field if the string field is encoded, removing meaningless and anti-scan junk string data, and translating the decompressed, decoded string field into one or more shadow space. Translating the decompressed, decoded string field can include changing a case of characters in the string field so that all characters in the string field are a same case.

The method of string signature scanning can further include decomposing a string signature containing at least one unknown size wildcard symbol into multiple signature substrings without wildcards. The method of string signature scanning can further include selecting a plurality of fingerprints for each string signature or signature substring, each successive fingerprint having a first basic unit that is shifted one unit from the previous fingerprint such that the number of shifted fingerprints is equal to a step size for a signature scanning operation. The method of string signature scanning can further include normalizing and translating the string field into a plurality of blocks, each block of the plurality of blocks including a fingerprint scan region for performing a fingerprint scan, a front signature search region in advance of the fingerprint scan region, and a rear signature search region behind the fingerprint scan region. The method can also include using the front and rear signature search regions to select a matching signature from a plurality of fingerprints.

The method of string signature scanning can further include scanning the string field, identifying one or more fingerprint segments in parallel using a hash table or a bloom filter followed by a hash value de-multiplexer, and synthesizing the identified fingerprint segments into one or more fingerprint match. The method of string signature scanning can further include scanning the string field, and identifying one or more fingerprints sequentially using a hash table or a bloom filter, a hash value de-multiplexer, and a fingerprint length de-multiplexer for resolving multiple matched fingerprints having different lengths. The method of string signature scanning can further include encoding a plurality of fragments of a signature with a plurality of mask bits and store the plurality of mask bits with the plurality of fragments for a complex string signatures. The method of string signature scanning can further include constructing a differential search structure using one or more distinct basic units among a plurality of string signatures. Scanning the string field can further include searching for a plurality of string signatures differentially.

In general, in one aspect, the invention features a signature scanning system. The system includes a signature pre-processing module, a scan pre-processing engine, a fingerprint scan engine, a fixed-size signature search engine, and a variable-size signature search engine.

Implementations can include one or more of the following features. The signature pre-processing module can construct a signature database, including a fingerprint database, a fixed-size signature database, and a variable-size signature database. The signature pre-processing module can decompose a string signature containing at least one unknown size wildcard symbol into multiple signature substrings without wildcards. The signature pre-processing module can select a plurality of fingerprints for each string signature or signature substring, each successive fingerprint having a first basic unit that is shifted one unit from a previous fingerprint such that the number of shifted fingerprints is equal to a step size for a signature scanning operation. The signature pre-processing module can decompose one or more fingerprints into a plurality of fingerprint segments and store synthesis information for said each fingerprint segment of the plurality of fingerprint segments in a fingerprint database and select one or more shadow spaces and translate one or more fingerprints into the one or more of the selected shadow spaces for scanning. The signature pre-processing module can encode a plurality of fragments of a signature with a plurality of mask bits and store the plurality of mask bits with the plurality of fragments for a complex string signatures and the signature pre-processing module can construct a differential search structure using one or more distinct basic units among a plurality of string signatures.

The scan pre-processing engine can decode, normalize, and translate a string field in a plurality of blocks, each block of the plurality of blocks including a fingerprint scan region for performing said a fingerprint scan, a front signature search region in advance of the fingerprint scan region for signature search, and a rear signature search region behind the fingerprint scan region for signature search. The fingerprint scan engine can detect one or more fingerprints in parallel using a hash table followed by a hash value de-multiplexer. The scan pre-processing engine can further include a scan feeder, a format decoder, a lowercase translator, a string memory, a decoded field memory, and a lowercase field memory. The fingerprint scan engine can further include a fingerprint scan controller, a fingerprint hash engine, a fingerprint search engine, a fingerprint synthesis engine, and a fingerprint database.

The fingerprint synthesis engine can synthesize a plurality of fingerprint segments into a fingerprint match if there is at least one matched fingerprint and synthesize a plurality of fingerprint segments into one or more fingerprint matches. The fingerprint hash engine can compute a plurality of hash values for a plurality of hash keys sequentially in non-overlapping prefix segments using a sequential hash function. The fixed-size signature search engine can further include a signature finder, a signature verifier, and a fixed-size signature database. The signature finder and the signature verifier can compare a plurality of masked fragments of a signature using a signature unit comparator and a signature segment comparator to identify one or more fixed-size signatures. The signature finder can search for a plurality of string signatures differentially. The variable-size signature search engine can further include, a signature rule lookup engine, a signature state verifier, a signature rule database, and a signature state table.

The invention can be implemented to realize one or more of the following advantages. A string scanning system for scanning signatures in a signature database is provided. The string scanning system is flexible and can be easily updated. A string signature scanning engine can provide up to 10 Gbps throughput even for a large number of signature (e.g., up to hundreds of thousands), complex signatures (e.g., up to thousands of bytes long, supporting wildcard "*" and "?", range, case-sensitive, negation), and a dynamic signature database. The string scanning system is scalable in both scan speed and signature database size and complexity. Additionally, the string scanning system can require less memory bandwidth and memory storage. The string scanning system can be implemented in both software, a field programmable gate array ("FPGA") and an application specific integrated circuit ("ASIC"). Furthermore, the string scanning system can be cost effective and suitable for use in both low-cost and high-end systems.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1A:
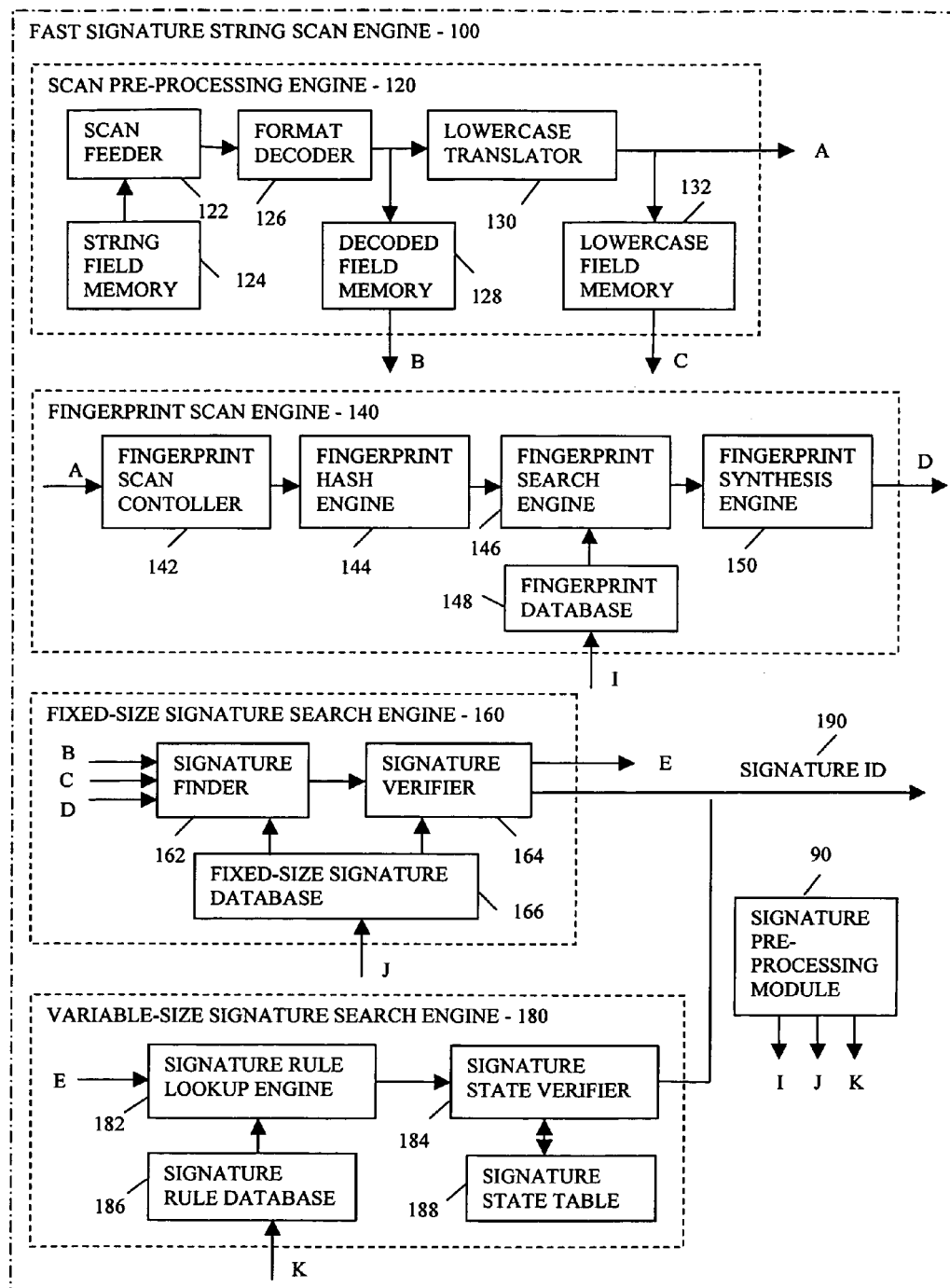
FIG. 1A illustrates a block diagram of a fast string signature scan system.

Methods and systems for performing string signature scan on a string field against a large and complex string signature database are provided. In one implementation, a "divide and conquer" approach is used to scan signature strings in multiple pipelining stages. In one implementation, scanning in multiple pipelined stages is supported by pre-processing the string signatures associated with the string field and storing the pre-processed string signatures in a signature database prior to scanning. FIG. 1A illustrates a signature string scan engine 100. The signature string scan engine 100 includes a signature pre-processing module 90, a scan pre-processing engine 120, a fingerprint scan engine 140, a fixed size signature search engine 160, and a variable-size signature search engine 180. The string signature scan engine 100 can scan string fields against one or more string signature databases and may return a matched signature ID 190 and the location of the matched signature within the string fields, identifying a particular signature. In one implementation, the signature database includes a fingerprint database 148, a fixed-size signature database 166, and a signature rule database 186.

Figure 1B:
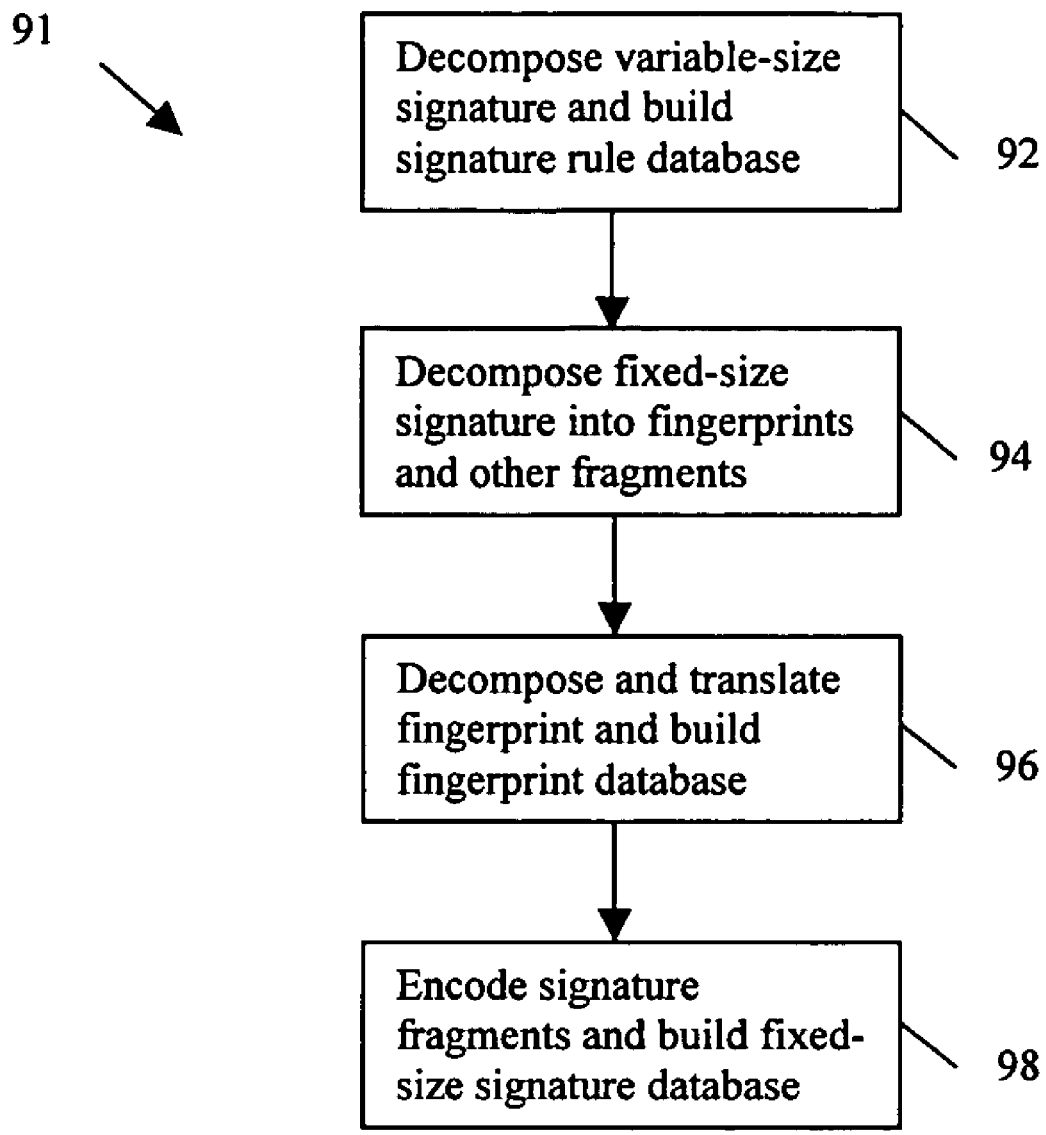
FIG. 1B shows a process for building a string signature database.

FIG. 1B shows a process 91 for pre-processing each string signature. In one implementation, a variable-size string signature can be decomposed into multiple fixed-size substrings using the variable wildcard symbol (e.g., "*") and stored with information describing a relationship among the substrings in the signature rule database 186 (step 92).

A fixed-size string signature or fixed-sized substring from step 92 can then be decomposed into multiple fragments that can be tested in an optimal order for fast scanning (step 94). In one implementation, the first fragments of a string signature can be particularly significant and function as a fingerprint for a fixed-size string signature or substring. The fingerprint of a string signature can be scanned quickly, but also minimizes a probability of a false negative or false positive result. In one implementation, the probability of a false negative is zero. When the scan step size is more than one basic unit, in one implementation, multiple fingerprints can be used for a single string signature, in which the first basic unit of each fingerprint can be shifted by one basic unit relative to each previous fingerprint.

The fingerprint of a string signature or substring can be further decomposed into fingerprint segments, translated into one or more shadow spaces, and then inserted into the fingerprint database 148 and thus the signature database (step 96). Because fingerprints of different lengths can be scanned independently, a fingerprint can be further broken up into multiple segments that can first be scanned either sequentially or in parallel. The scanning results can then be synthesized together for detecting the fingerprint.

In order to further gain the scan efficiency and capability for complex signatures, in one implementation, the fingerprint as well as other fragments of a string signature can first be translated into and scanned in a shadow space and then verified in the original space. The shadow space is a space in the most general and normalized format. The shadow space can be selected for being able to simplify and accelerate the scan process, while also being operable to cover all the possible forms of the fingerprints or fragments. For example, to support per character case-insensitive and case-sensitive, the shadow space can be either a lowercase only or uppercase only space. After being scanned in their shadow spaces, the fingerprints can be verified in an original fingerprint space.

In one implementation, the fingerprint database is an enhanced bloom filter or hash table, where additional bits of hash value and fingerprint length are stored in the data structure for hash value multiplexing as well as fingerprint length multiplexing to further reduce the false positive and the number of collisions when the original hash key is too large or too costly to be compared.

Finally, all the fragments of a fixed-size string signature or substring of a variable-size string signature can be encoded and stored into fixed-size signature database 166 for searching through the entire fixed-size string signatures or sub-strings (step 98). In one implementation, the fragments can be encoded with per basic unit or sub basic unit masks for string signatures matching particular criteria (e.g., "don't care", "equal", "unequal", "case-insensitive", "case-sensitive", "in a range", "out of a range"). In one implementation, the masked fragments can then be compiled into a linked list or other search structures (e.g., trees). In another implementation, a group of string signatures can be further encoded differentially to form a differential data structure (e.g., differential trees), where signatures are encoded using their different basic units among the string signatures.

Figure 1C:
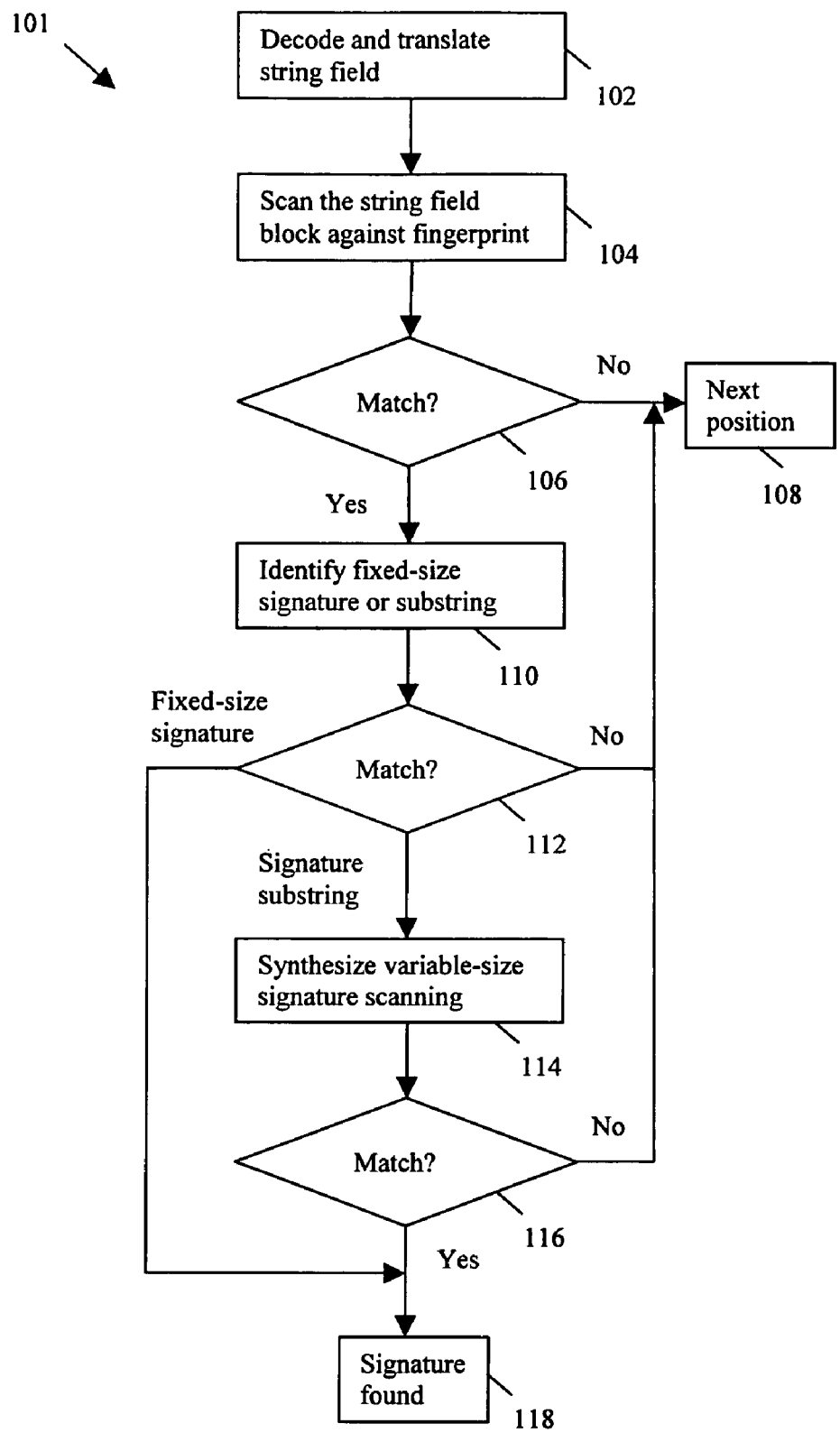
FIG. 1C shows a process for string signature scanning.

FIG. 1C shows a process 101 for scanning string signatures. A string field to be scanned is first decoded and translated (e.g., using scan pre-processing engine 120) into one or more formats for subsequent scan stages (step 102). The string field is scanned (e.g., using the fingerprint scan engine 140) in the shadow space by first comparing a shadow of the string field against one or more shadows of the fingerprints of string signatures and then verifying in the original fingerprint space (step 104). A check is made to see if there is a fingerprint match (step 106). After scanning a no match condition or a matching condition results in either an output indicating that no string signatures match a particular fingerprint, or that a small number of signatures matches. In one implementation, the fingerprint scan engine 140 provides output results with zero false negatives and an allowable number of false positives. If there are zero matches, the scanning process is complete at the current scan position and can move into a next scan position (step 108). If a positive match is detected in the fingerprint scanning, further searches through (e.g., by a fixed-size signature search engine 160) the small number of matched signatures are performed to more specifically identify either a particular fixed-size signature ID or a fixed-size signature substring of a variable-size signature (step 110). A check is made to see if there is a fixed-size string signature or substring match (step 112). If there are zero matches, the scanning process is complete at the current scan position and the process can move to the next scan position (step 108). If the matches are one or more fixed-size signatures, a fixed-size signature ID for each match is output and the scan is completed (step 118). If the fixed-size signature substring is instead identified as part of one or more variable-size signatures the variable-size signatures can then be dynamically synthesized (e.g., by a variable-size signature search engine 180) to detect one or more variable-size signature IDs (step 114). A check is made to see if there is a variable-size string signature match (step 116). If there are zero matches, the scanning process is complete at the current scan position and ready to move into the next scan position (step 108). If the match is one or more variable-size signatures, a variable-size signature ID for each match is output and the scan is completed (step 118).

During step 102, the scan pre-processing engine 120 first decodes, normalizes, and translates the string field into the same format(s) as signatures in the string signature database. In one implementation, the string signature scanning is performed on the entire string field. However in other implementations, buffering the entire string field can be impossible because of limitations in memory space and low latency requirements of some computer systems. Therefore, during step 102, the string field can be broken into a number of predefined blocks. The string signature scanning is then performed on each predefined block of data.

After loading a block of string field for the string signature scanning, the block of data can then be decoded and normalized to different formats for later scanning. In one implementation, the decoding and normalizing process can accommodate different compression formats (e.g., LZS, PKZip, and gzip) and different encoding formats (e.g., "uuencode", MIME encoding, HTML, and XML) and remove random, "anti-scan" junk data.

In one implementation, the decoded string fields are further translated into one or more fingerprint shadow spaces as in the string signature database, to support complex string signatures. For example, the decoded string fields are translated into all-lowercase (e.g., a shadow space) to support case-insensitive string signature scanning. The string signature scanning can then be performed on the all-lowercase decoded string fields and then verified using both case specific decoded string fields and all-lowercase decoded string fields.

During step 104, fingerprint scanning can be first performed to identify fingerprints of signatures whose shadows are fully specified string s in the shadow spaces. In one implementation, to scan a large and complex string signature database quickly, the fingerprint scan engine 140 can scan multiple basic units based on either an enhanced hash table or bloom filter. In one implementation, hash value multiplexing as well as fingerprint length multiplexing can be used by the fingerprint scan engine 140, to use the memory storage more efficiently and reduce the false positive results and probability of fingerprint collision (i.e., more than one fingerprint matching a particular signature). The use of hash value multiplexing and fingerprint length multiplexing can minimize the number of false positive results (i.e., erroneous signature matches in the string field), while ensuring zero false negative results (i.e., failing to match a signature in the string field).

During step 110, fixed-size signature scanning is performed. The fixed-size string signatures and the fixed-size substring of variable-size string signatures can be identified during the fixed-size signature scanning stage. Fixed-size signature scanning is performed only when at least one fingerprint is found during fingerprint scanning. The fixed-size string signatures and the substring of the variable-size string signatures that are associated with matched fingerprints can be searched linearly or based on other search structures (e.g., trees) in the decoded format. In one implementation, masked comparisons can be supported per basic unit or sub basic unit for string signatures matching particular criteria, (e.g., "don't care", "equal", "unequal", "case-insensitive", "case-sensitive", "in a range", "out of a range").

During step 114, variable-size signature scanning is performed. In one implementation, variable-size signature scanning is required only for variable-size string signatures or string signatures including one or more "variable" wildcard symbols. The fixed-size signature substrings of a variable-size string signature can be identified during fixed-size signature scanning and the results can then be dynamically concatenated to synthesize one or more original variable-size signatures during the variable-size signature scanning step. The synthesis can be performed by using a synthesis rule table and a synthesis state table. The synthesis rule table defines the rules for synthesizing a variable-size string signature, while the synthesis state table maintains the current state of synthesizing against the synthesis rules.

Signature Database Pre-processing

In one implementation, string signatures are processed by the signature pre-processing module 90 before the string field is scanned against them to gain scanning speed and memory efficient. The signature pre-processing module 90 can decompose, translate, or encode the signatures into one or more formats prior to storage in the signature database. In one implementation, the signature pre-processing module 90 can build and maintain a fingerprint database 148, a fixed-size signature database 166, and a signature rule database 186.

When one or more string signatures in the signature database include a variable wildcard symbol (i.e., "*"), each of these variable-size string signatures can be first decomposed into multiple fixed-size substrings using the variable wildcard symbol. For example, if a string signature is substring1*substring2*substring3, where substring1, substring2, and substring3 are strings without a variable wildcard symbol, the string signature is broken into substring1, substring2, and substring3. In one implementation, each of the fixed-size substrings is first scanned independently and then synthesized back into the original variable-size signature. In one implementation, signature rule database 186 can be constructed for the substring synthesis using the information regarding the relationship among the substrings (e.g., order, last substring flag, distance to next substring).

In one implementation, a fixed-size string signature or substring is further encoded into multiple fragments (the fragments including the fingerprint of the signature or signature substring) that can be tested in an optimal order. The multiple fragments can be of different sizes. To prevent false negatives or to provide a zero miss rate against all the signatures, the union of all the fragments is equal to the original string signature. During the signature scanning, the false positive decreases (i.e., the confidence level of matching increases), as the number of positive fragments increases. The testing process can terminate after either a first negative fragment or a last positive fragment. In one implementation, the fragments can be selected for either terminating the scanning without a signature matching as early as possible or identifying a signature matching with a false positive rate that decreases to zero.

In one implementation, the fingerprint comprises a plurality of fragments. In another implementation the fingerprint comprises only one fragment that is encoded in the form of a 3-tuple including {fragment, length, offset}, where a fragment is the first fragment or fingerprint of the string signature, a length is a length of the fingerprint, and an offset is the offset from the fingerprint to a second fragment. A particular fingerprint is a particular substring of a fixed-size string signature or a fixed-size substring of a variable-size string signature.

In one implementation, the shadow space can be selected for being able to simplify and accelerate the signature scan process, while also being operable to cover a plurality of forms of the fingerprints or fragments of signatures. Ideally, the shadow value can be directly used as a hash key. For example, to support per character case-insensitive and case-sensitive, the shadow space can be either a lowercase only or uppercase only space. For example, to scan driver license numbers comprising one alphabetic character followed by seven numerical characters in which each character can be further specified as an arbitrary range within the alphabetic or numerical character, the shadow space can be a codeword or any one of alphabetic characters (e.g., "a") for all the alphabetic characters and another codeword or any one of numerical characters (e.g., "0") for all the numerical characters. For example, to scan social security numbers ("SSN") comprising three groups of three numerical characters separated by either "space" or "-" in which each numerical character can be further specified as an arbitrary range within numerical character, the shadow space can be a codeword or any one of numerical characters (e.g., "0") for all the numerical characters and another codeword or either "space" or "-" for both "space" and "-". For a special case, the shadow space can be the original fingerprint space in scan systems comprising only simple string signatures.

In one implementation, after being scanned in their shadow spaces, the verification of the fingerprints in the original space can be performed immediately after detecting the shadows. In another implementation, the verification can be performed after testing some or all other fragments of the signature. No verification is needed if the fingerprints or fragments scanned in their shadow spaces overlap with other fragments of the signature.

The fingerprint can be selected to speed up the fingerprint scanning, while providing a minimal probability of a false negative or false positive result after the fingerprint scanning. In one implementation, the fingerprints can be of arbitrary size and at any location within the string signatures.

In one implementation, fingerprints can be selected using one or more of the following criteria: 1) there is no wildcard or range in the shadow of the fingerprint for quicker scanning, 2) the fingerprint is unlikely to occur in the string field to be scanned, 3) the number of fingerprints shared by more than one signature is as small as possible, 4) the number of fingerprints shared a same fingerprint segment is as small as possible. Additional criteria can be added according to the system requirements. Typically, most string signatures, if not all the string signatures, in conventional network applications and non-network applications include at least one reasonable size substring without a wildcard or range after translating into a selected shadow space. In one implementation, criteria no. 1 is a requirement. The string signatures that do not contain such a substring can either be expanded into multiple signatures containing such a substring or scanned without expansion using a different scanning approach.

The fingerprints can be determined by examining all the possible substrings of a string signature that meet the requirements of criteria no. 1. Additional parameters for the fingerprints can also be considered in selecting fingerprints. By identifying fingerprints that are unlikely to occur in the string field to be scanned, according to criteria no. 2, the number of false positives can be reduced because it is unlikely that multiple signatures will include the same fingerprint. Additionally, by selecting fingerprints such that few signatures share the same fingerprint or the same key fingerprint segment, the number of initial matches that turn out to be false can be further reduced. The length of the fingerprints can be e.g., between 8 and 32 bytes, although the fingerprints can be shorter than 8 bytes or longer than 32 bytes.

Because the signatures can be very long (e.g., hundreds or thousands of bytes in length), there can also be a large number of fingerprint lengths. However, in one implementation, the fingerprints of different lengths are scanned separately, resulting in slower scanning performance. In one implementation, to reduce the complexity of the scanning, the number of fingerprint lengths can be limited, e.g., less than 16, according to particular system requirements and system architectures. In one implementation, the lengths of fingerprints can be selected from a predefined length list. Furthermore, the lengths of the fingerprints can be selected to be exponential (e.g., 2, 4, 8, 16, 32). The fingerprint lengths can also be selected uniformly (e.g., multiples of 4: 4, 8, 12, 16, 20, 24, 28, 32), or based on another method (e.g., 2, 3, 5, 8, 13, 21, 34), in accordance with the system requirements and system architecture.

In another implementation, the fingerprint scan engine 140 moves a scan step size each time. At each scan position, the fingerprint scan engine 140 can scan for fingerprints of different sizes either sequentially or in parallel. As a result, the scanning speed linearly depends on the scan step size (i.e., the number of basic units between two consecutive scan positions). In one implementation, to increase scanning speed, the fingerprint scanning can be performed on multiple basic units rather than a signal basic unit. In order to ensure zero false negatives, multiple fingerprints in which their first basic units are shifted one basic unit can be used for each string signature and the number of the fingerprints can equal the scan step size. In other words, a fixed-size string signature or signature substring can be inserted into the signature database using multiple fingerprints and the number of the fingerprints can be equal to the scan step size. The signature can then be found at any location within the string field to be scanned. When the scan step size is one, only one fingerprint and thus one insertion is required. For example, if a particular string signature is "[Rr][Ee][Aa][Dd][Mm][Ee]123.exe", the scan step size is 4, and the fingerprint lengths include 4, 8, and 12, the following four fingerprints can be selected: "[Rr][Ee][Aa][Dd][Mm][Ee] 123.ex", "[Ee][Aa][Dd][Mm][Ee] 123.exe", "[Aa][Dd][Mm][Ee]123.", and "[Dd][Mm][Ee]123.e", where the [Rr], [Ee], [Aa], [Dd], and [Mm] are case-insensitive r, e, a, d, and m, respectively. Using the four fingerprints, "[Rr][Ee][Aa][Dd][Mm][Ee] 123.exe" is inserted into the signature database four times.

In one implementation, the fingerprint is selected from the longest fully specified substring of a string signature in the shadow space while also having a length that is less than the max fingerprint length for a particular system or application. Thus, the fingerprint length=min {[1/s]*s, max fingerprint length}, where the l is the length of the longest fully specified substring of the string signature in the shadow space and the "s" is the scan step size.

In another implementation, the fingerprint of a signature can be selected using an algorithm. For example, the following algorithm can be used to find the fingerprint of a signature: (assuming the scan step size is equal to one, the lengths of fingerprints are fixed and given as $l_0, l_2, l_2, \ldots, l_{m-2}, l_{m-1}$ from the shortest to the longest, the fingerprint scan is performed in segments and the corresponding signature is only stored in the first fingerprint segment, and the shadow space for the fingerprint scan is given).

1. All the substrings of the signatures that are fully specified, after being translated into the shadow space, are identified. 2. for each of the substrings that are longer than $1_{m-1}$, identify all of substrings having a size $1_{m-1}$. 3. for each of the substrings of length $1_{m-1}$, identify the number of other fingerprints colliding with the substring, $N_c$, and the number of other fingerprints sharing the first fingerprint segment with it, $N_s$, and find a cost value using a cost function of the $1_{m-1}, N_c$ and $N_s$. 4. Steps 2 and 3 are repeated for substrings having a size $1_{m-2}, \ldots, 1_2, 1_1,$ and $1_0$. 5. Identify a fingerprint based on the smallest cost value from steps 2 to 4. The above algorithm depends on the processing order of signatures. Several random orders can be applied to identify different fingerprints as necessary. In one implementation, the cost value can be obtained concatenating (m-i), Nc, and Ns, from a most significant bit to a least significant bit, where i=0, 1, 2, ..., m and the i is a fingerprint size index. In one implementation, if a fingerprint having a particular size is found, no further selecting process is required on all the smaller sizes.

To increase the scan step size to S basic units, a modification of the above algorithm can be used for finding S fingerprints as follows:

1. Identify all substrings comprising S substrings of length lm, ..., l2, l1, and l0 that each successive substring has a first basic unit that is shifted one unit from the previous substring. 2. Extend the cost function to a function of the (li)0, (Nc)0, (Ns)0, (li)1, (Nc)1, (Ns)1, ..., (li)S−1, (Nc)S−1, and (Ns)S−1, for i=0, 1, 2, ..., m, where (li)j, (Nc)j, and (Ns)j are the size, the Nc, and Ns of the substring at the jth shift position. In one implementation, the cost value can be obtained by concatenating (m-i0), (m-i1), ..., (m-iS−1), (Nc)0, (Nc)1, ..., (Nc)S−1, (Ns)0, (Ns)1, ..., and (Ns)S−1. In another implementation, the cost value can be obtained by concatenating the sum of (m-i0), (m-i1), ..., and (m-iS−1), the sum of (Nc)0, (Nc)1, ..., and (Nc)S−1, and the sum of (Ns)0, (Ns)1, ..., and (Ns)S−1.

The shadow of a fingerprint can be scanned as a whole. The shadows of fingerprints of different lengths can be scanned either sequentially or in parallel. In one implementation, the fingerprints of different lengths are scanned as a whole and sequentially. In one implementation, inserting a string signature into the signature database can be performed using the following pseudo-code:

```
For (i = 0, i < s−1, i++)
{
    {fingerprint shadow_i, h_i} = fingerprint selection(string signature);
    k_i = h_i/s;
    Previous hash value = IV;
    For(j = 0, j < k_i−1, j++)
    {
        Hashed length = j*s;
        Current hash string = fingerprint shadow_i[hashed length, hashed length+s−1];
        Current hash value = hash (current hash string, previous hash value);
        Previous hash value = current hash value;
    }
    If (i = 0), signature search pointer = signature insertion (string signature);
    Fingerprint insertion (current hash value, signature search pointer);
}
``` where the s is the scan step size, the hi is the length of $i^{th}$ fingerprint of a string signature, IV is the initial hash value, and the hash( ) is the sequential hash function. The fingerprint selections selects the optimal fingerprint for each shift location, the signature insertion( ) creates the signature search data structure for fixed-size signature search engine 160 and variable-size signature search engine 180 for the signature, and the fingerprint insertion( ) inserts the fingerprint into the fingerprint database 148. When the scan step size is more than one, one fingerprint insertion is required for each of the fingerprints of a string signature. However, only a single signature insertion( ) is necessary for all the fingerprints of a string signature, because all the fingerprint entries of the string signature point to a same signature search data structure.

In one implementation, deleting a string signature from the signature database can be performed using the following pseudo-code:

```
For (i = 0, i < s−1, i++)
{
    k_i = h_i/s;
    Previous hash value = IV;
    For(j = 0, j < k_i−1, j++)
    {
        Hashed length = j*s;
        Current hash string = fingerprint shadow_i[hashed length, hashed length+s−1];
        Current hash value = hash (current hash string, previous hash value);
        Previous hash value = current hash value;
    }
    Signature search pointer = fingerprint deletion (current hash value);
    If (i = 0), signature deletion (signature search pointer, string signature);
}
``` where s is the scan step size, the $h_i$ is the length of $i^{th}$ fingerprint, IV is the initial hash value, and the hash( ) is the sequential hash function. The fingerprint deletion( ) deletes the fingerprint from the fingerprint database 148, and the signature deletion( ) deletes the signature search data structure for fixed-size signature search engine 160 and variable-size signature search engine 180 for the signature. To delete a signature from the signature database, multiple fingerprint deletions are required because there are multiple fingerprints for a single signature when the scan step size is more than one. However, only a single signature deletion is necessary for all the fingerprints of a particular signature.

In one implementation, a fingerprint can be further broken into multiple segments in order to gain the scan efficiency. All the fingerprint segments of a fingerprint can be first scanned either sequentially or in parallel. The results of the fingerprint segment scanning can then be synthesized together for detecting the fingerprint. The size of the segments can be the same or different, depending on the lengths of the fingerprints for a specific scan engine. In one implementation, the number of segments and the sizes of the segments can be selected according to the lengths of the fingerprints and other scan parameters for a specific scan engine. In another implementation, the lengths of the fingerprints are selected linearly and all the fingerprint segments have a same size. Typically the size of a fingerprint segment is one or multiple times the scan step size.

In one implementation, the fingerprint database can be a bloom filter or a hash table. Typically, using either the hash table or the bloom filter results in a trade off between memory efficiency and memory bandwidth. When the number of the string signatures can fit into on-chip memories that provide sufficient memory bandwidth, the bloom filter may be preferred. Alternatively, when the number of string signatures is large, such that off-chip memory is required, the memory bandwidth is the main constraint and thus the hash table may be preferred instead of the bloom filter.

In one implementation, additional bits of hash value are stored with a bloom filter or a hash table for hash value multiplexing. In another one implementation, fingerprint length can be stored with a bloom filter or a hash table for fingerprint length multiplexing. The hash value multiplexing as well as fingerprint length multiplexing can further reduce the false positive and collision chance when the original hash key is too large or too costly to be compared.

In one implementation, after the shadow spaces, fingerprints, fingerprint segments, and fingerprint data structure have been determined, a fixed-size string signature or substring of a variable-size string signature can be inserted into the fingerprint database 148 and thus the signature database either as a whole or in segments in the shadow spaces.

In one implementation, the fragments other than the fingerprints of a fixed-size string signature or substring of a variable-size string signature can be encoded and stored into fixed-size signature database 166 for scanning through the entire fixed-size string signature or substring after a fingerprint is matched. In one implementation, all the fragments of a fixed-size string signature or substring of a variable-size string signature are encoded with per basic unit or sub basic unit masks for string signatures matching particular criteria, (e.g., "don't care", "equal", "unequal", "case-insensitive", "case-sensitive", "in a range", "out of a range") resulting in a plurality of masked fragments.

In one implementation, the masked fragments can then be linked together by a linked list either in-order or out-of-order of the string signature or complied into other search structures (e.g., trees). In one implementation, the lengths of the masked fragments can be variable or fixed size for all the masked fragments. The length of the masked fragments can be selected optimally for a particular memory architecture.

In another implementation, a group of string signatures can be further encoded differentially against one another to form a differential data structure (e.g., differential trees), in order to reduce the number of possible signatures to zero or one quickly, in addition to let the false positive of detecting a string signature converging to zero as fast as possible. The differential tree can be constructed using the different basic units among the string signatures.

In one implementation, signature database pre-processing is performed only during initial signature database creation, when adding one or more new signatures, or when deleting one or more existing signatures. In one implementation, the signature database can be updated dynamically during the signature scanning.

Scan Pre-processing on String Field

The scan pre-processing engine 120 pre-processes string fields into different formats in according to string signature database to simplify and accelerate the processing in a later pipelined stage. In one implementation, the signatures in the signature database are not stored in an encoded format. Therefore, a decoding process can be applied by the scan pre-processing engine 120 to an encoded string field to match the decoded format of the signatures in the signature database. As illustrated in FIG. 1, the scan pre-processing engine 120 includes a scan feeder 122, a string field memory 124, a format decoder 126, a decoded field memory 128, a lowercase translator 130, and a lowercase field memory 132. The scan feeder 122 loads data to be scanned from the string field memory 124 to the format decoder 126. The format decoder 126 performs decoding, parsing and decompressing, which can include MIME decoding, UU decoding, foreign language decoding, removing unnecessary string data including meaningless string data (e.g., extra white space) and anti-scan junk string data (e.g., injected anti-scan junk data), HTML parsing, XML parsing, deflate decompressing, LZS decompressing, PKZip decompressing, and gzip decompressing. The format decoder 126 can normalize the string field according to requirements of a particular system. After decoding and normalizing the string field, the format decoder 126 can store the decoded data in the decoded field memory 128.

The data stored in the decoded field memory 128 can include case-sensitive signatures. To support case-insensitive signatures, the lowercase translator 130 translates the data from the decoded field memory 128 into all-lowercase and stores the lowercase string fields into the lowercase field memory 132. The all-lowercase string fields are used for the fingerprint scanning by the fingerprint scan engine 140. Both case-sensitive and case-insensitive signatures can then be scanned at substantially the same time. A match for a case-sensitive signature can be verified using, e.g., the case-sensitive decoded field.

In one implementation, the scanning system 100 includes computing resources or network equipment that allow string signature scanning to be performed on an entire string field. However, in another implementation, the scanning system 100 includes computing resources or network equipment that is unable to buffer an entire string field due, for example, to system limitations of memory space and low latency requirements. As a result, the string field can be broken into a number of predefined blocks. The string signature scanning can then be performed on each predefined block. In one implementation, the size of a block is determined by the maximum string signature size. The block of data can be further broken up into three regions: one region for reference data in advance of the fingerprint, one region for fingerprint scanning, and one region for reference data behind the fingerprint. The three regions can have either a same size or different sizes. The scan block size can be selected according to the parameters of the scanning system, such as the maximum signature size, the memory structure, and the scan speed. The scan block size can be a few times, e.g., 2-4 times, the maximum signature size when the maximum signature size is large. For a smaller maximum signature size, the multiple factor can be larger.

In one implementation, the three regions have a same size equaling the maximum string signature size. The three regions can be placed into three memory banks forming a ring for minimizing data movement in memory.

In one implementation, a block includes a current effective fingerprint scan area and each block includes two reference regions having a portion of the string field in advance of the current fingerprint scan area and another portion of the string field prior to the current fingerprint scan area. Therefore, the blocks of data overlap each other by the reference data.

In one implementation, the string field memory 124 includes the last memory bank only and thus the size of the string field memory 124 equals the maximum string signature size. Both the decoded field memory 128 and the lowercase field memory 132 include all three memory banks and thus their size equals three times of the maximum string signature size.

Special conditions exist for the first and the last blocks due to boundary conditions. In one implementation, impossible basic units of the maximum signature size can be padded into the reference area before the fingerprint scan area of the first block and after the fingerprint scan area of the last block. Impossible basic units include data which no signature sequence begins or ends with, thus the padded reference area cannot be part of an actual signature. The padding is not needed if a valid range checking mechanism is added into the fingerprint scan engine 140, fixed-size signature search engine 160, and variable-size signature search engine 180. The range checking mechanism prevents scanning beyond a string field boundary.

Fingerprint Scanning

As illustrated in FIG. 1A, in one implementation, the fingerprint scan engine 140 includes a fingerprint scan controller 142, a fingerprint hash engine 144, a fingerprint search engine 146, a fingerprint database 148, and a fingerprint synthesis engine 150. In one implementation, a fingerprint is scanned as a whole. The fingerprint synthesis engine 150 is an optional component for implementations in which the fingerprint is scanned as a whole.

In another implementation, each fingerprint is broken up into multiple segments that are first scanned independently. All the segments of a fingerprint can be first scanned either sequentially or in parallel and then synthesized (e.g., using the fingerprint synthesis engine 150) to generate scanning results of the fingerprint. In one implementation, the fingerprint scan controller 142 controls the entire scan processing.

The fingerprint scan engine 140 can return a result of no matches or a matched entry in the fingerprint database. The matched entry corresponds to one or more string signatures that can subsequently be searched by the fixed-size signature search engine 160 and the variable-size signature search engine 180. The scanning process is completed if there is no matched entry.

In one implementation, the fingerprint hash engine 144 includes multiple independent universal hash functions, $h_0$, $h_1, \ldots, h_l$, to support bloom filters. Bloom filters can be used, for example, when the memory size rather than the memory bandwidth is constrained. For example, memory size can be constrained in a scanning system where the signature database is small enough to fit into on-chip memory. In another implementation, the fingerprint hash engine 144 includes a single hash function $h_0$. A simple hash table can be used, for example, when the memory bandwidth rather than the memory size is constrained. For example, memory bandwidth can be constrained when the signature database is large, such that an off-chip memory is used.

The fingerprint hash engine 144 takes n-bytes of data from the lowercase field memory 128 and hashes the data. The data can be hashed alone or with either initial random values (IV) or previous hash values to generate current hash values for all of the hash functions. In one implementation, one of the hash functions, for example, the first hash function $h_0$, generates more bits of the hash value than the other hash functions that generate the same number of bits of hash values.

The hash values from the hash functions can be used to search through the fingerprint database 148 using the fingerprint search engine 146. In one implementation, the fingerprint search engine 146 includes a bloom filter and a hash de-multiplexer. The bloom filter checks all the valid bits indexing by the hash values. If all the valid bits are set, the hash de-multiplexer searches through a corresponding hash bucket for a hash value that has extra bits. The de-multiplexing is performed by checking the extra bits of a particular hash value, fingerprint length, and other information about the fingerprint. The hash de-multiplexer can further reduce false positive signature match results. In one implementation, the bloom filter can be reduced into a hash table.

The fingerprints of different lengths can be scanned either in parallel or sequentially. In one implementation, multiple fingerprint search engines 146 can be used to scan in parallel. For example, one fingerprint search engine 146 can be used for scanning each different fingerprint length.

In another implementation, a single fingerprint search engine 146 can perform a sequential fingerprint scan. For example, the lengths of the fingerprints can be a multiple of the scan step size. For each fast string signature scan engine 100, there is a valid set of fingerprint lengths, $\{s, 2*s, 3*s, \ldots, m*s\}$, where s is the scan step size and the m*s is the maximum fingerprint size. At each scan location, the fingerprints of different lengths are scanned sequentially. A sequential hash function that applies to an s-byte substring of the fingerprints can be used for the scanning. In one implementation, sequential fingerprint scanning of the fingerprint scan engine 140 can be described with the following pseudo-code:

```
k = [t/s];
For (i = 0, i < k-1, k++)
{
  Scan position = i*s;
  Previous hash value = IV;
  For (j = 0, j < m-1, j++)
  {
    Hashed length = j*s;
    if (scan position + hashed length < t)
    {
      Current hash string = string field[scan position + hashed length,
                                          scan position + hash length + s - 1];
      Current hash value = hash (current hash string, previous hash value);
      Signature search pointer = fingerprint database search(current hash
                                                              value);
      Signature ID = signature search (signature search pointer);
      Previous hash value = current hash value;
    }
  }
}
``` where the s is the scan step size, the m*n is the maximum fingerprint size, the t is the total length of string field to be scanned, the IV is the initial hash value, and the hash( ) is a sequential hash function. The fingerprint database search( ) is performed in the fingerprint search engine 146 and the fingerprint synthesis engine 150, while the signature search( ) is performed in the fixed-size signature search engine 160 and variable-size signature search engine 180.

Figure 2A:
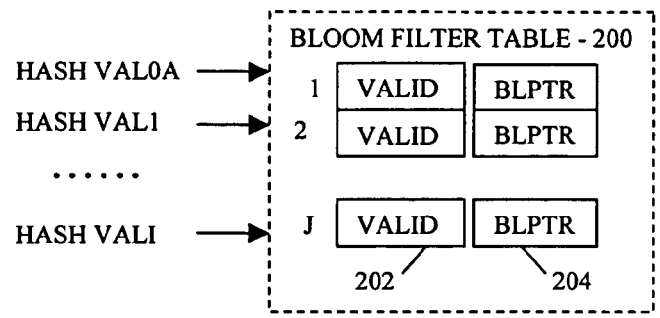
FIGS. 2A-2C illustrates data structures of a fingerprint database.
Figure 2B:
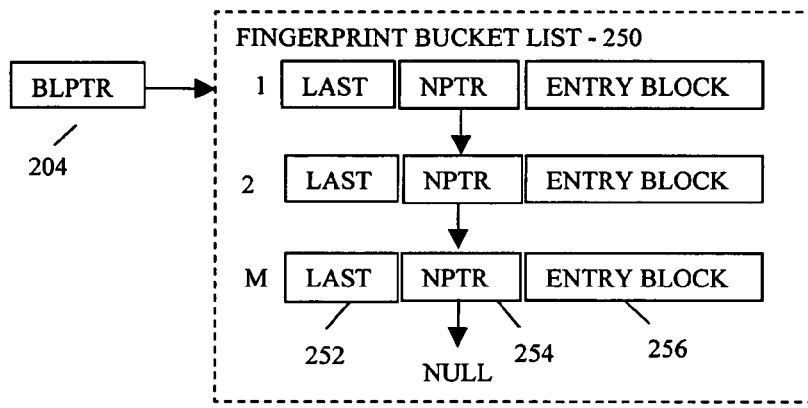
Figure 2C:
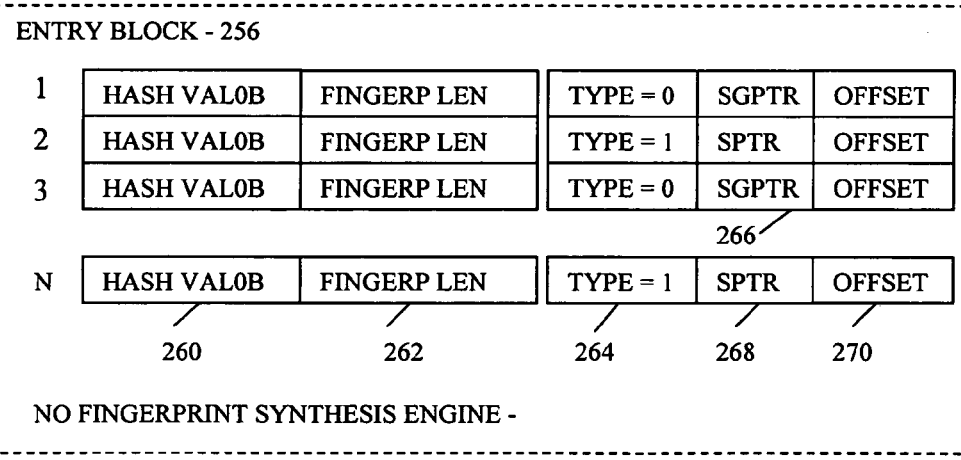

FIGS. 2A-C illustrate data structures of fingerprint database 148 that include a bloom filter table 200, a fingerprint bucket list 250, and a hash entry block 256, when fingerprints of different lengths are scanned as a whole. By using the hash values, {hash value0a, hash value1, . . . , hash valuei}, from the fingerprint hash engine 144, the hash fingerprint search engine 146 indexes into the bloom filter table 200. Each entry of the bloom filter table 200 includes a valid flag 202 and a bucket list pointer ("blptr") 204. The valid flag 202 is a flag that is set when there is at least one string signature in the entry. In one implementation, the blptr 204 is only valid for the hash value0a and is a bucket list pointer for a header of the fingerprint bucket list 250. If all the bits of valid flag 202 indexed by all the hash values are set, further fingerprint scanning can be performed on the fingerprint bucket list 250 pointed to by the blptr 204.

In one implementation, the fingerprints are inserted into an entry of the bloom filter table 200 using the hash value0a, while the other hash values can be used to reduce the false positives. Additionally, to delete a string signature without affecting other string signatures, a counter for each entry can be used for tracking a number of signatures in the entry. In another implementation, the bloom filter table 200 can be reduced into a hash table with only one hash value (e.g., hash value0a).

In one implementation, the fingerprint bucket list 250 is a linked list. Each element of the fingerprint bucket list 250 includes a last flag 252, a next element pointer ("nptr") 254, and an entry block 256. The nptr 254 points to a next element of the fingerprint bucket list 250. When a tail of the fingerprint bucket list 250 is reached, the last flag 252 is set. The last flag 252 is an optional bit introduced for fast detection of the tail because the tail can also be detected by checking if the nptr 254=NULL. Each entry block 256 includes up to n fingerprint entries, where n is any integer larger than 0. In one implementation, an optimal n can be selected based on the memory architecture of the scanning system. For example, for a SRAM architecture, n can be equal to one, while n>1 can be used for a DRAM architecture.

In one implementation, each fingerprint entry in the entry block 256 of the fingerprint bucket list 250 includes a hash value ("hash val0b") 260, a fingerprint length ("fingerp len") 262, a type 264, a signature group pointer ("sgptr") 266 or signature pointer ("sptr") 268, and an offset 270 as illustrated in FIG. 2C. The hash val0b 260 and fingerp len 262 are introduced for hash value multiplexing and fingerprint length multiplexing, respectively. When the type 264=0, a sgptr 266 is returned for a signature group; otherwise, a sptr 268 is returned for a single signature. The offset 270 is the offset from the header of the fingerprint to the next basic unit to be compared or the header of the next substring to be compared. The offset 270 is not required for all the next data structures. The offset 270 can be set to 0, when not required for the next data structure. In another implementation, a valid bit can be added into each fingerprint entry in the entry block 256 for n>1. The hash val0b 260 and the fingerp len 262 can also be checked when the valid bit is set.

In one implementation, each fingerprint entry in the entry block 256 is designed for storing a single fingerprint. However, in another implementation, because the original fingerprints can be very long, have different sizes, and because there are more signature search stages after the fingerprint database search, the original fingerprint is not included in each fingerprint entry. As the result, each matched fingerprint entry can include either no fingerprint due to the probability of false positives or more than one fingerprint due to the probability of fingerprint collision. When a simple hash table rather than a bloom filter table is used for the fingerprint scanning, the probability of false positive is substantially on the order of $(k/2^m)$ and the probability of collision is substantially on the order of $(k^2/2^{2m})$ for $(k/2^m) \ll 1$, where the k is the number of fingerprints in total and the m is the number of bits in the hash value0 that includes the hash value0a and hash value0b. The probabilities can substantially decrease when a bloom filter table is used. To minimize signature searches at later stages, both the probability of a false positive and the probability of fingerprint collisions can be reduced to substantially zero. In one implementation, sufficiently large m can be selected to minimize the probability of a false positive and fingerprint collisions.

To reduce storage space, in one implementation, multiple hash values can be multiplexed into a single fingerprint database to reduce the probability of empty entries. Each hash value can be broken into two pieces: hash value1 of m1 bits and hash value2 of (m−m1) bits. The hash value1 can be used for indexing into a fingerprint database, while the hash value2, (e.g., hash val0b 260), can be used for resolving the hash collisions and the false positives. The smaller the value of m1, the less the required storage space, but the longer the fingerprint bucket list 250. In one implementation, the average length of the fingerprint bucket list is less than 1 when $2^{m1}$ is substantially 2 or more times k.

To save storage space and reduce the complexity of the table management, in another implementation, all the fingerprints of different lengths can be multiplexed into a single fingerprint database. The fingerprint length, fingrp len 262, can be introduced to further reduce the probability of a false positive and the probability of a fingerprint collision.

The search data structures illustrated in FIGS. 2A-C can be implemented in several different ways. A particular implementation can be selected based on the size of signature table, the available memory sizes and their types such as on-chip SRAM, on-chip DRAM, off-chip SRAM, and off-chip DRAM. For example, in one implementation, if the size of the signature table is 128K, the valid flag 202 can be put in an on-chip SRAM for faster access. The blptr 204 can be put into a table in an off-chip SRAM. The valid flag 202 is accessed by all the hash values, while the blptr 204 is only indexed by the hash value, hash val0a. The blptr 204 is accessed, only when each valid flag 202 for all the hash values are set. The last 252 and nptr 254 can be put in a table in an off-chip SRAM and the hash val0b 260 and fingrp len 262 can be put in another table in an off-chip SRAM or DRAM, while the type 264, sgptr 266, sptr 268, and offset 270 are put in another table in an off-chip DRAM. The type 264, sgptr 266, sptr 268, and offset 270 can be accessed when both the hash val0b 260 and fingerp len 262 are matched.

In one implementation, to gain scanning efficiency, a fingerprint of a string signature can be broken up into multiple segments that are first scanned either sequentially or in parallel and then synthesized by the fingerprint synthesis engine 150 to generate the scanning results of the fingerprint. Breaking up the fingerprint of a string signature into multiple segments for scanning can reduce the false positive for longer fingerprints that include more fingerprint segments, when the false positive rate for a shortest fingerprint is equal to the false positive rate when all the fingerprints are scanned as a whole.

Figure 2D:
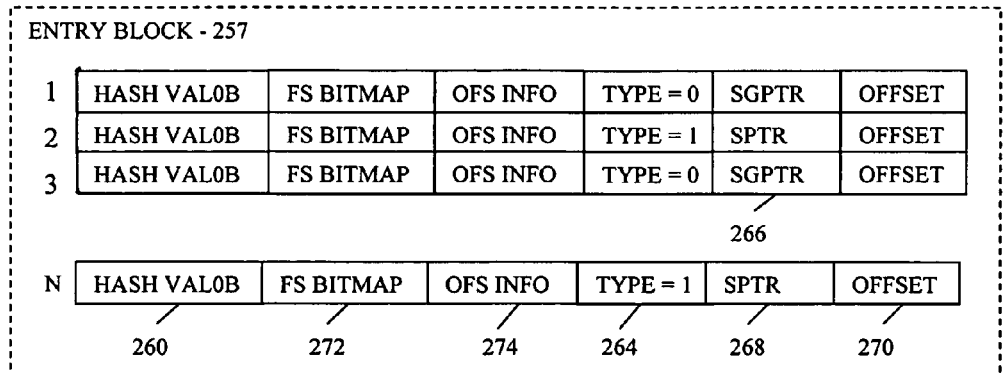
FIGS. 2D-E illustrates data structures of a hash entry block and an implementation of a fingerprint synthesis engine.
Figure 2E:
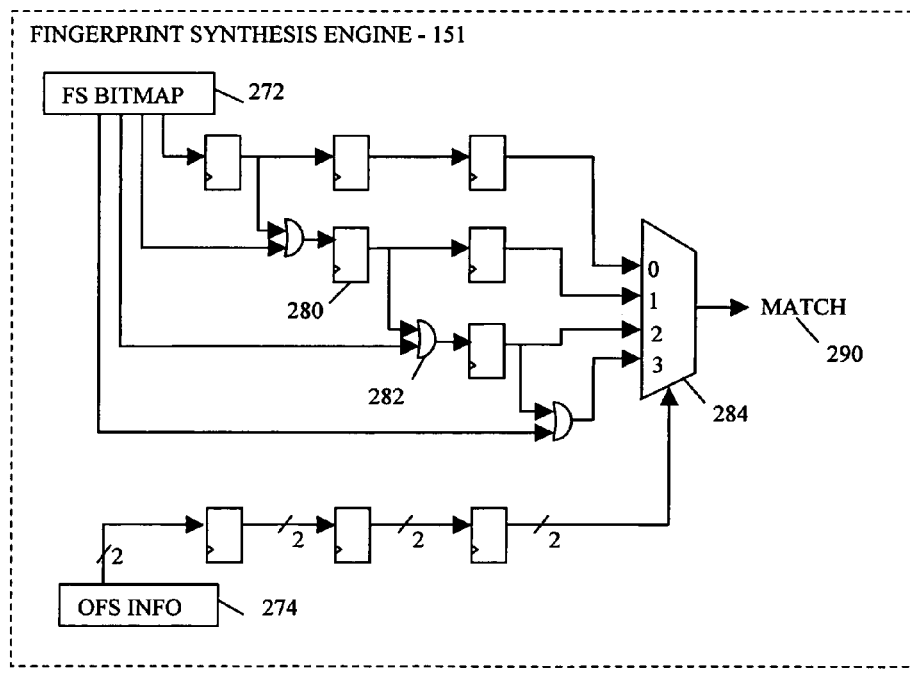

FIGS. 2D-E illustrates an alternative implementation of data structures for the entry block and corresponding fingerprint synthesis engine for generating scanning results when multiple fingerprint segments are scanned sequentially for the case where there is at-least-one match. In one implementation, a match will be reported as far as at least one fingerprint is detected, but no information regarding how many fingerprints are matched and the length of the fingerprint is reported.

As illustrated in FIG. 2D, each entry in the entry block 257 includes a hash val0b 260, a fingerprint segment bitmap ("fs bitmap") 272, an at-least-one match fingerprint synthesis information ("ofs info") 274, type 264, sgptr 266 or sptr 268, and offset 270. The fs bitmap 272 is a valid bitmap array and where the number of bits is the same as the number of the fingerprint segments. The ith bit in a fs bitmap 272 is set when the entry includes an ith segment of a fingerprint. The osf info 274 is the fingerprint synthesis information for the at-least-one match case specifying how many segments are in the shortest fingerprint. The osf info 274 is stored in the first segment of the fingerprint. The hash val0b 260 is the same as in FIG. 2C. The type 264, sgptr 266, sptr 268, and offset 270 are also the same as those in FIG. 2C, are stored with the first segment of a fingerprint, and are used after delaying by the number of segments less 1 clock cycle. In one implementation, because the type 264, sgptr 266, sptr 268, and offset 270 fields are only stored in the first segment, all the fingerprints sharing the same first segment are stored together. In one implementation, the chance of multiple fingerprints sharing the same fingerprint segment is minimized during the selection of the fingerprint.

FIG. 2E illustrates an implementation of the corresponding fingerprint synthesis engine 151. In one implementation, the fingerprint segment size is selected to be the same as the scan step size. For example, both the fingerprint segment size and scan step size can be equal to four such that the lengths of the fingerprints are 4, 8, 12, and 16. The fingerprint synthesis engine 151 includes twelve D flip-flops 280, three 2-input AND gates 282, and a 4-input MUX 284. Input is provided by the fs bitmap 272 and the ofs info 274. The fingerprint synthesis engine 151 outputs a match 290 if a fingerprint is found. In another implementation, the fingerprint synthesis engine 151 can be used for other scan step sizes, number of fingerprint segments, and lengths of the fingerprints. In one implementation, the fingerprint synthesis engine 151 can output one fingerprint scanning result at every clock cycle, since multiple fingerprint matches can be collapsed into a single at-least-one match.

Figure 2F:
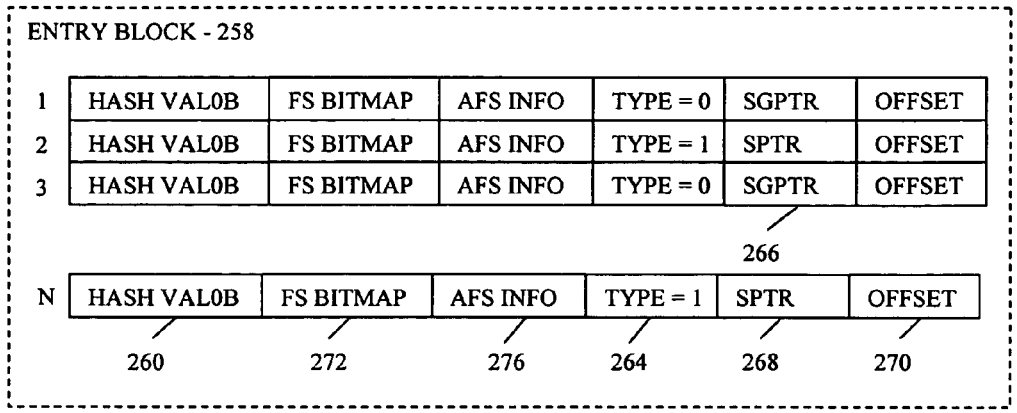
FIGS. 2F-2G illustrates data structures of a hash entry block and an implementation of the corresponding fingerprint synthesis engine.
Figure 2G:
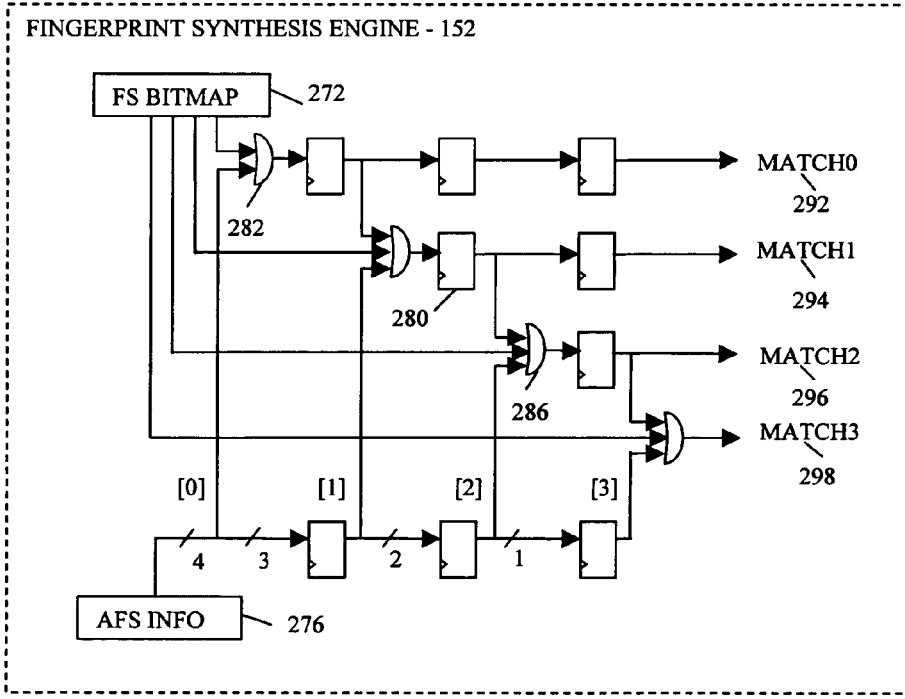

FIGS. 2F-G illustrate an alternative implementation of data structures for the entry block and a corresponding fingerprint synthesis engine for the case in which all detected matches are presented ("all matches" case) when multiple fingerprint segments are scanned sequentially. One or more later stage scans can be required when more than one fingerprint of different lengths are detected as a signature match.

As illustrated in FIG. 2F, each entry in the entry block 258 includes a hash val0b 260, a fs bitmap 272, an all match fingerprint synthesis information ("afs info") 276, a type 264, a sgptr 266 or sptr 268, and an offset 270. The afs info 276 is the fingerprint synthesis information for all matches and the number of bits in the afs info 276 is the same as the number of fingerprint segments. The ith bit in the afs info 276 is set when bit is an ith segment of a fingerprint. The other fields in the entry block 258 correspond to the fields in FIG. 2D.

FIG. 2G illustrates an implementation of the corresponding fingerprint synthesis engine 152 for a case having more than one fingerprint segment size. The fingerprint synthesis engine 152 uses the same scan step size, fingerprint segment size, and fingerprint lengths as in FIG. 2E. The fingerprint synthesis engine 152 includes twelve D flip-flops 280, a 2-input AND gate 282, and three 3-input AND gates 286. The fingerprint synthesis engine 152 outputs a match0 292, a match1 294, a match2 296, and a match3 298, for respectively matching a fingerprint of one segment long, two segments long, three segments long, and four segments long. In one implementation, the entry block 258 in FIG. 2F can be expanded to have multiple sets of the type 264, sgptr 266 or sptr 268, and offset 270 fields; one set of fields for each fingerprint length. Furthermore, in one implementation, the information regarding the exact length of a fingerprint can also be used in further scanning stages.

The fingerprint synthesis engine 152 can scan all the fingerprints of different lengths. However, because the type 264, sgptr 266 or sptr 268, and offset 270 fields are stored in a single fingerprint segment, all the fingerprints sharing that segment are stored together. Proper selection of the fingerprints for each string signature can minimize the effect. However, to eliminate the effect, the type 264, sgptr 266 or sptr 268, and offset 270 can be stored in another table indexed by all matched segments. All the addresses to the matched segments can be used for locating an entry in the table.

Figure 2H:
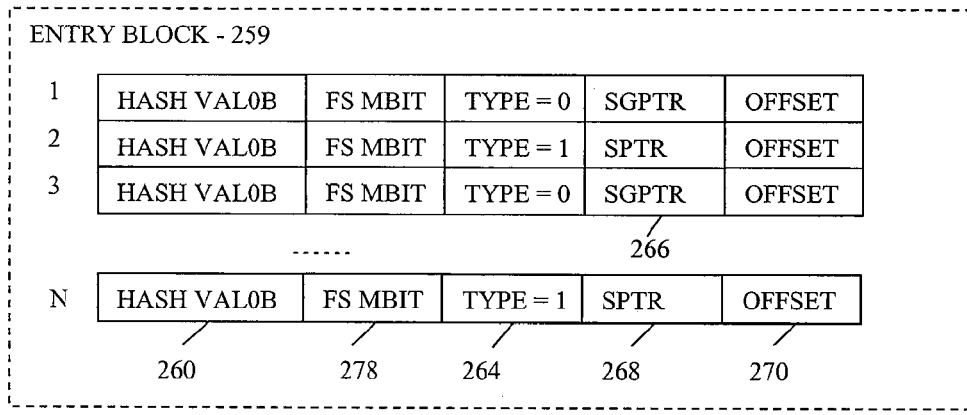
FIGS. 2H-I illustrates data structures of a hash entry block and an implementation of the corresponding parallel fingerprint synthesis engine.
Figure 2I:
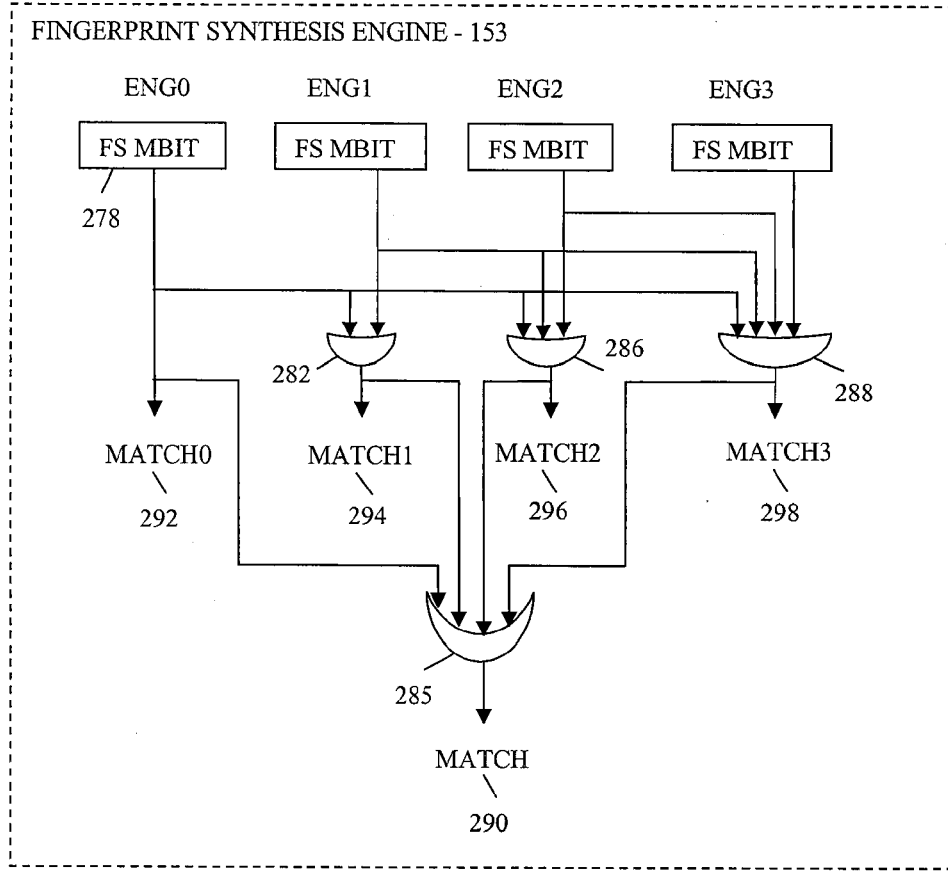

FIGS. 2H-I illustrate another implementation of data structures of an entry block and a corresponding fingerprint synthesis engine operating in parallel for both the at-least-one match case and the all matches case, when multiple fingerprint segments are scanned in parallel. As illustrated in FIG. 2H, each entry in the entry block 259 includes a hash val0b 260, a fingerprint segment match bit ("fs mbit") 278, a type 264, a sgptr 266 or sptr 268, and an offset 270. The fs mbit 276 is a match bit for the fingerprint segment. The other fields correspond to fields in the entry block 257 of FIG. 2D.

FIG. 2I illustrates an implementation of the corresponding fingerprint synthesis engine 153 that operates in parallel and includes a 2-input AND gate 282, a 3-input AND gate 286, a 3-input AND gate 288, and a 4-input OR gate 285. The fingerprint synthesis engine 153 outputs a match0 292, a match1 294, a match2 296, and a match3 298 for all match cases, while outputting a single match 290 for the at-least-one match case. In one implementation, the parallel fingerprint segment scanning can speed up the scanning speed for a large scan step size that is multiple times of the size of the fingerprint segment.

Fixed-Size Signature Scanning

Referring back to FIG. 1A, the fixed-size signature search engine 160 includes a signature finder 162, a signature verifier 164, and a fixed-size signature database 166. The signature finder 162 can identify a fixed-size string signature, a fixed-size substring of a variable-size string signature, or a signature family that includes multiple fixed-size signatures or substrings. The signature strings or substrings identified by the signature finder 162 can then be verified by the signature verifier 164. The fixed-size signature database 166 is a database for the signature finder 162 and the signature verifier 164.

Figure 3A:
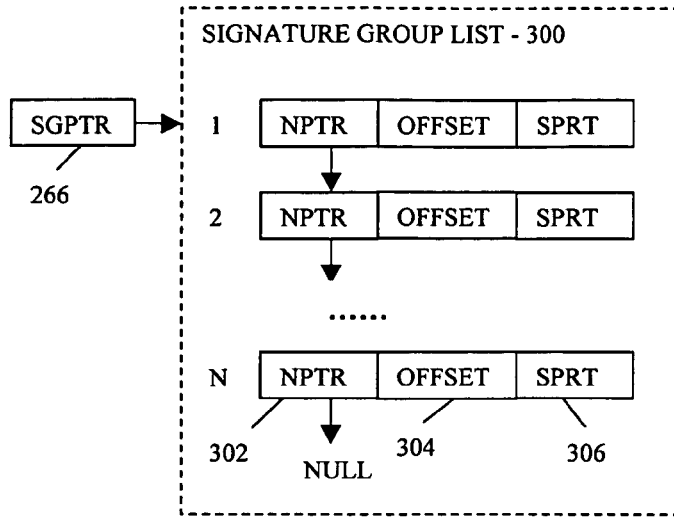
FIGS. 3A-B illustrates data structures of a signature group list and a signature list for fixed-size signature searching.
Figure 3B:
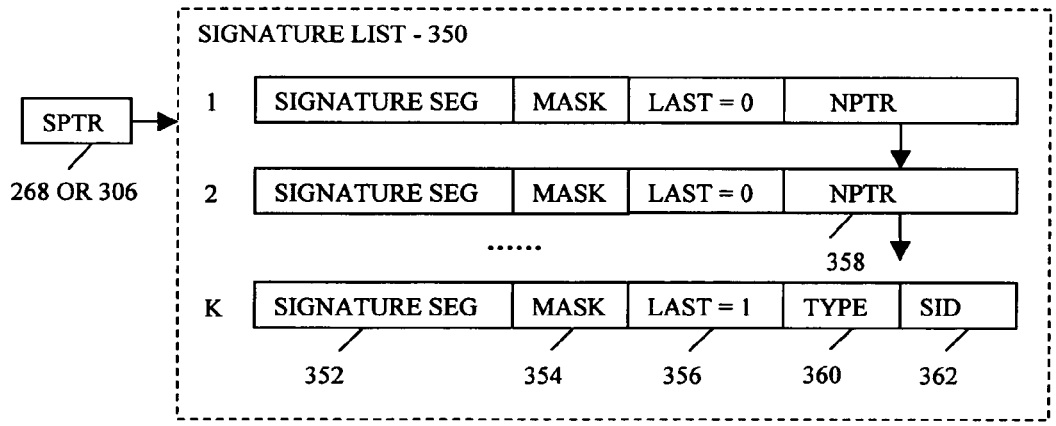

The fixed-size signature database 166 can be implemented in various search data structures. In one implementation, as illustrated in FIGS. 3A-B, the fixed-size signature database 166 is a two dimension linked list, a signature group list 300, formed by linking multiple signature lists 350 together. Each element of the signature group list 300 includes a next element pointer ("nptr") 302, an offset 304, and a signature pointer ("sptr") 306. The nptr 302 is a next point that points to a next element in the signature group list 300, while the sptr 306 points to a particular signature list 350. The offset 304 specifies the offset from a header of a particular fingerprint to the header of a particular string signature pointed to by the sptr 306.

To form a signature list 350, each fixed-size string signature or substring of a variable-size string signature can be broken into multiple signature segments 352. The signature segments 352 can be linked together in the scan order from the first basic unit of a string signature or signature substring. In one implementation, the segments can have a different size. In an alternative implementation, all the segments can have a same size and the size can be optimally selected according to the system architecture. Each element of the signature list 350 includes a signature segment ("signature seg") 352, a mask 354, a last flag 356, a next pointer ("nptr") 358, a type 360, and a signature/string ID ("sid") 362. The nptr 358 is a next pointer and the last flag 356 is a tail flag. When the type 360 has a value of 0, the sid 362 is a string ID 364; otherwise, the sid 362 is a signature ID 366. The mask 354 is used to specify certain criteria including: "don't care", "equal", "unequal", "in a range", "out of a range", "case-insensitive", and "case-sensitive" on the basic unit or even sub basic unit. Specifying the criteria can be performed by selecting the sources and results of a comparison unit. If a string signature is not a multiple of the segment size, the string signature is padded with, up to (the segment size –1), 0s at the tail of the string signature and the mask for padding units shall be set to "don't care". In one implementation, the mask 354 for each basic unit has 3 bits. The first bit is set equal 0 for "case-insensitive" and 1 for "case-sensitive", while the last two bit are set equal to 0 for "equal", 1 for "unequal", 2 for "don't care", and 3 for "reserved". Additional mask bits can be used for selecting any other comparison format, such as a pre-defined ranges (numerical characters or alphabetic characters), as needed.

In one implementation, the signature finder 162 can search through the signature group list 300 until a tail, where the nptr 302 has a value of NULL, is reached. For each element of the signature group list 300, a sptr 306 value that points into a signature list 350 is returned.

The signature verifier 164 can perform signature verification for each signature list 350. The signature verifier 164 exams each signature segment one by one in the scan order, starting from the header of the string signature. The signature verifier 164 will exit the signature verification, if no match is found; otherwise, the signature verifier 164 searches through the entire signature list 350 until a tail, where last 356 has a value of 1, is reached. If a match is found, the signature verifier 164 returns a string ID 364 for a substring of a variable-size string signature, if type 360 is 0; otherwise, a signature ID 366 is returned for a fixed-size string signature.

In another implementation, the signature segments 352 can be linked together in an optimal order in order to make the false positive matches converge to zero quickly as the number of segments increases. An offset field specifying the offset between a current segment and a next segment shall be added into each entry of the signature list 350. Although the lengths of the segments can vary from one segment to another segment, a fixed length of segments can be selected.

Figure 4A:
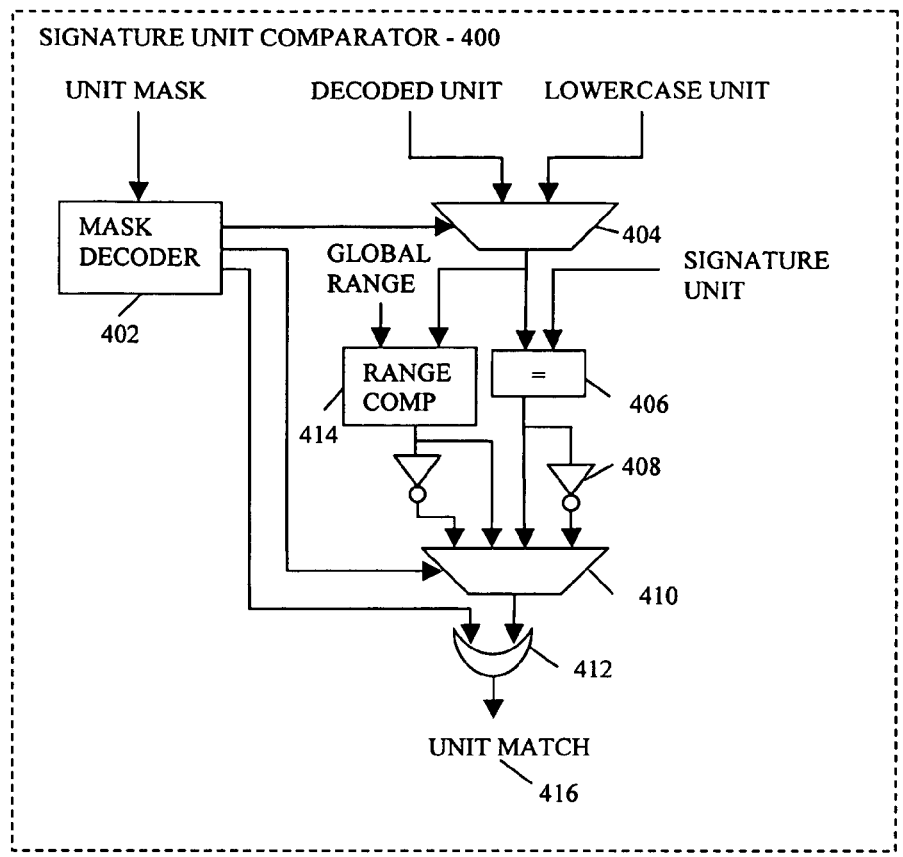
FIGS. 4A-B illustrates block diagrams of a signature unit comparator and a signature segment comparator for a pre-defined, global unit range for a string field.
Figure 4B:
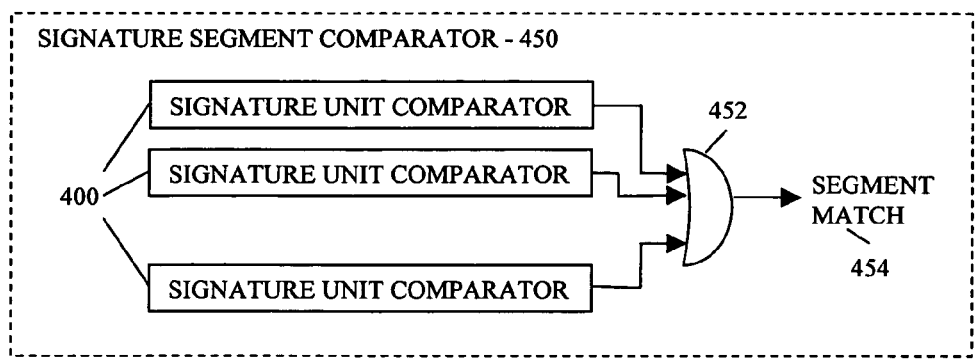

FIGS. 4A-B illustrate block diagrams of a signature unit comparator 400 and a signature segment comparator 450 in accordance with one implementation. The signature unit comparator 400 can perform the comparisons in the fixed-size signature searches. The signature unit comparator 400 includes a mask decoder 402, a 2-input MUX 404, an equal comparator 406, two inverters 408, a 4-input multiplexer 410, a 2-input OR gate 412, and a range comparator 414. The mask decoder 402 can decode mask bits into control signals for the source and output of the equal comparator 406 and range comparator 414. In one implementation, the range comparator 414 is optional for a predefined, global range for either each string field or each string signature. In one implementation, m range comparators 414 can be used for supporting m predefined, global ranges. In another implementation, a unit match 416 can be sent out before performing a logic OR with a "don't care" bit.

Figure 4C:
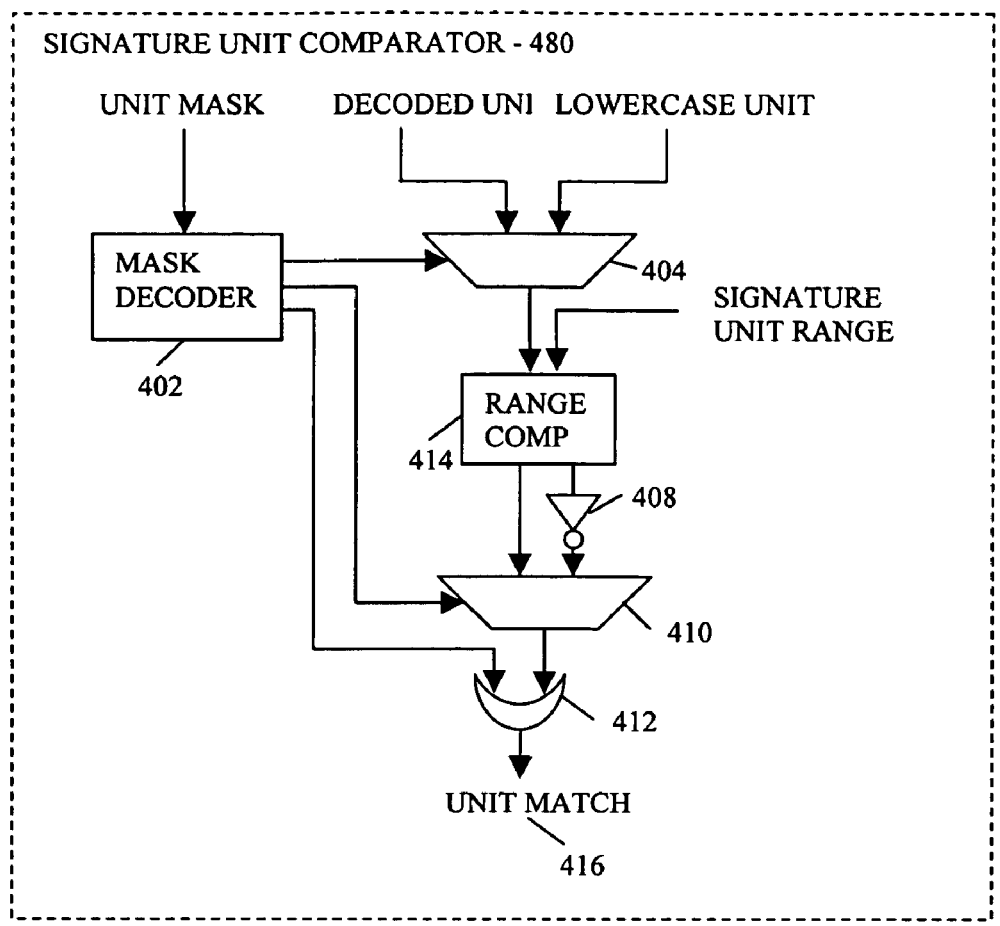
FIG. 4C illustrates block diagrams of a signature unit comparator for use with a local signature unit range.

Multiple signature unit comparators 400 and a multiple input AND gate 452 can be used to build a signature segment comparator 450. The unit of data used by the signature segment comparator 450 is typically a byte, but can also be a nibble or any other size. In another implementation, the signature unit comparator 400 can be replaced by a signature unit comparator 480, as illustrated in FIG. 4C, to support a local signature unit range. Each masked unit in the signature seg 352 can be expanded into a masked unit range, or a masked pair of units that specify the lower and upper bounds of the signature unit.

Figure 5A:
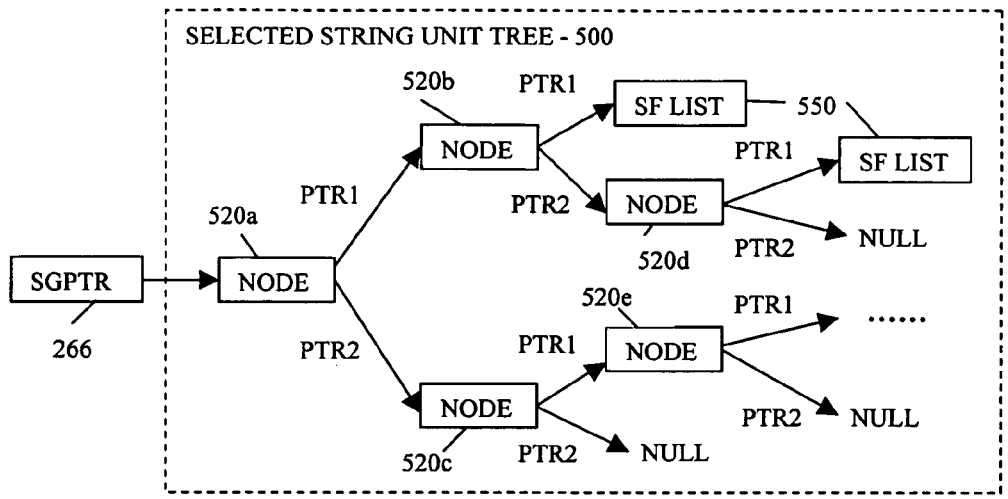
FIGS. 5A-C illustrates the data structures of a selected unit tree and a signature family list for fixed-size signature searching.
Figure 5B:
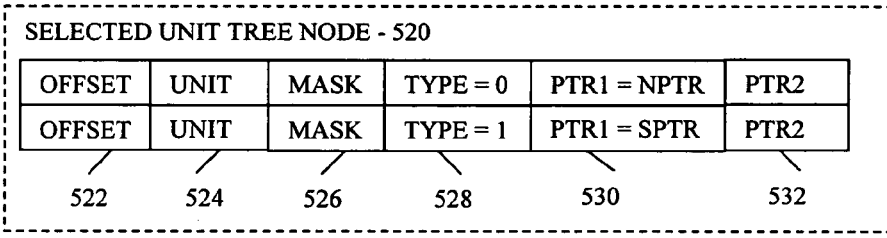

In one implementation, multiple signature lists can be searched by the fixed-size signature search engine 160 (FIG. 1). However, the probability of searching multiple signature lists is typically very low. Differential encoding, in which the signatures in a signature group are encoded against each other, can be used when searching multiple signature lists. For example, in one implementation, a selected string unit tree 500, as illustrated in FIG. 5A, can be designed as a search data structure for the signature finder 162 (FIG. 1). Selected string unit tree 500 includes nodes 520a-520e. At each node 520 of the selected string unit tree 500, there can be two branches, one matched branch pointed by ptr1 530 and another unmatched branch pointed by ptr2 532. As shown in FIG. 5B, there can be two different types of nodes in the selected string unit tree 500, as illustrated by selected unit tree node 520: a leaf node in which the type 528 has a value of 1 and a non-leaf node in which the type 528 has a value of 0. For a non-leaf node, the matched branch always points into another node 520 in the tree and the unmatched branch points into either another node 520 in the tree or NULL. For a leaf node, the matched branch always points into a signature family list 550, shown in FIG. 5C, and the unmatched branch points into either another node 520 in the tree or NULL.

In one implementation, as illustrated in FIG. 5B, each node 520 of the selected string unit tree 500 includes an offset 522, a unit 524, a mask 526, a type 528, a ptr1 530, and a ptr2 532. The type 528 includes a type for the leaf and non-leaf nodes described above. The selected string unit 524 can correspond to any location within a string signature and the location can be given by either the offset 522 in the previous node 520 if the node 520 is not the root of the tree (e.g., the previous node of node 520b is node 520a, but node 520a does not have a previous node because node 520a is the root of the string unit tree 500), or the offset 270 in the matched fingerprint bucket list element 250 (FIG. 2B) if the node 520 is the root of the tree (e.g., node 520a). Each selected string unit includes mask 526 that corresponds to the mask 354 in the signature list 350 (FIG. 3B).

There is at least one basic unit different for any two string signatures if one of the string signatures is not a substring of another string signature. A string unit 524 can therefore be selected to differentiate at least two string signatures so that at least one signature can be eliminated by matching the string unit 524. Ambiguity among the signatures having at least one different basic unit can be resolved by searching through the selected string unit tree 500. The selected string unit tree 500 is illustrated in one implementation as a binary tree. In one implementation, a corresponding k-nary selected string unit tree can also be constructed. In one implementation, k units in a unit location from k signatures in a signature group can be used in each node of the k-nary tree, although more than one basic unit or a substring from a single signature can also be used in each node of the k-nary tree.

In one implementation a string signature can be a substring of another string signature. The signatures that have child-parent relationships can be indistinguishable to the selected string unit tree 500. In one implementation, no further scan is required after detecting any one of the signatures, thus is not necessary to distinguish between string signatures and substrings of a string signature. As a result, only the shortest substring is scanned. However, in another implementation, distinguishing between each of the signatures or identifying a longest signature is needed.

Figure 5C:
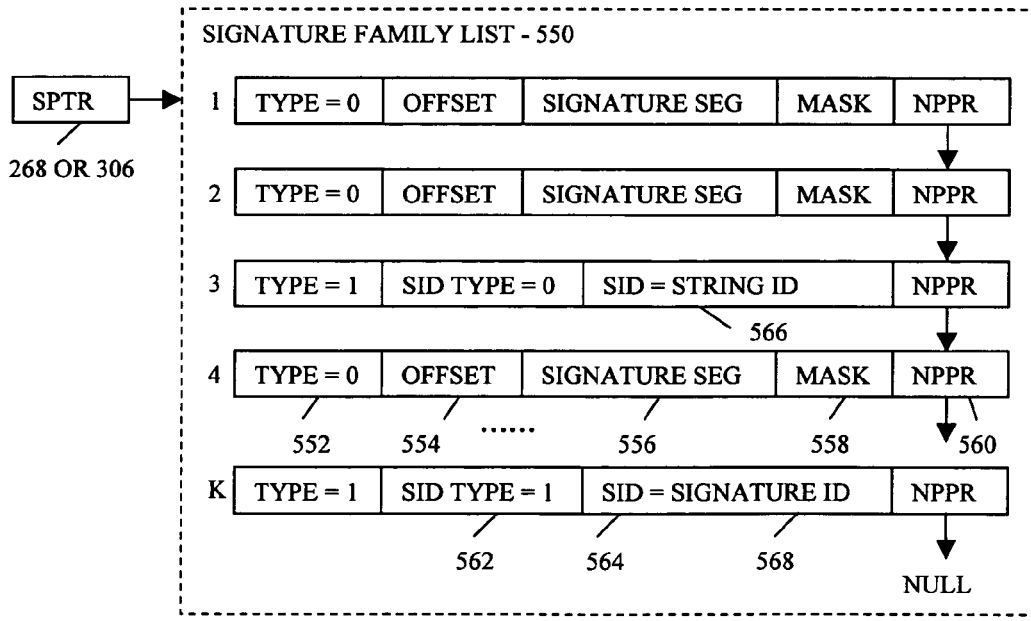

To support a family of signatures that has child-parent relationships, in one implementation, a signature family list 550, as illustrated in FIG. 5C, is provided as a search data structure for the signature verifier 164 (FIG. 1). Each element of the signature family list 550 includes a type 552, an offset 554, a signature segment 556, a mask 558, a nptr 560, a sid type 562, and a sid 564. In one implementation, to support a family of signatures, the signature family list 550 has two types of elements: a search element with the type 552 has a value of 0 and a result element with the type 552 has a value of 1. At each search element, a fixed-size signature segment 556 is compared according to the mask 558. The signature segment 556 and mask 558 are the same as those in the signature list 350 (FIG. 3B). However, there is no signature segment comparison for the result elements. In one implementation, the system searches for all matched signatures. For each matched signature, a sid 564 is returned. However, the signature search continues for a matched signature's parents until a tail of the signature family list 550, where the nptr 560 has a NULL value, is reached. There are two types of the sid 564: a signature ID 568 and a string ID 566. The type of the sid 564 is given by the sid type 562. When the sid type 562 has a value of 0, the sid 564 is the string ID 566 for a substring of a variable-size string signature; otherwise, the sid 564 is the signature ID 568 for a fixed-size string signature.

In one implementation, the signature family list 550 is linked from the youngest generation, or the shortest substring, to the oldest generation of the family. The offset 554 specifies the offset from a header of a current signature segment 556 to the header of a next signature segment 556. The searching of the signature family list 500 can be stopped, if no match is found. Specifying the offset between signature segments can allow for early termination of the searching by identifying a mismatch.

In one implementation, the signature family list 550 can only support a single signature in each generation of a signature family. If there is more than one signatures in one particular generation, multiple signature family lists 550 are used, one for each signature in the particular generation. Each multiple signature family list 550 can be distinguished by the selected string unit tree 500.

Variable-size Signature Scanning

Referring back to FIG. 1, the fixed-size signature search engine 160 returns the string IDs, their sizes and locations within the string field for all the substrings of all the variable-size string signatures in the scan order. Using the information from the substrings, the variable-size signature search engine 180 matches variable-size string signatures. The variable-size signature search engine 180 includes a signature rule lookup engine 182, a signature state verifier 184, a signature rule database 186, and a signature state table 188. The signature rule database 186 can define signature rules for synthesizing the substrings of a variable-size string signature into the variable-size string signature. The signature state table 188 dynamically stores all the states for the syntheses processing.

The signature rule lookup engine 182 identifies the signature rules associated with the matched string IDs from the signature rule database 186 and provides the associated signature rules to the signature state verifier 184. The signature state verifier 184 updates the signature state table 188 and synthesizes the matched string IDs into one or more variable-size string signatures according to the signature rules.

Figure 6:
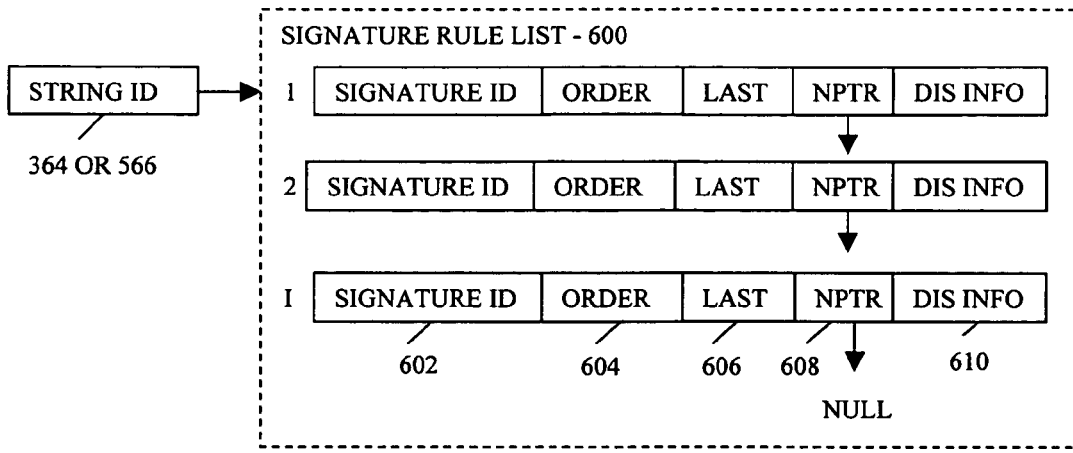
FIG. 6 illustrates a data structure of a signature rule list for variable-size signature searching.

There are various data structures for the signature rule database 186 and the signature state table 188. In one implementation, as illustrated in FIG. 6, the signature rule database 186 can be implemented as a signature rule list 600. The signature rule list 600 can be indexed by a string ID from the fixed-size signature search engine 160. Multiple variable-size string signatures can contain the same substring. The signature rule list 600 can link together all the variable-size string signatures that contain a particular substring given by the string ID.

In one implementation, each element of the signature rule list 600 corresponds to a variable-size string signature. Each element includes a signature ID 602, an order 604, a last flag 606, a next element pointer ("nptr") 608, and a distance range information ("dis info") 610. The signature ID 602 identifies a particular variable-size string signature. The order 604 specifies an order of the substring given by the string ID among all the substrings of the variable-size string signature. The last flag 606 indicates whether or not the substring given by the string ID is the last substring of the variable-size string signature. The last flag 606 indicates the completion of the variable-size string signature search processing. The nptr 608 is a next pointer that points to a next element of the signature rule list 600. The dis info 610 is an optional field specifying a distance range between a current substring and a next substring. The dis info 610 can be omitted, for example, in situations where the range is pre-defined or infinite.

Figure 7:
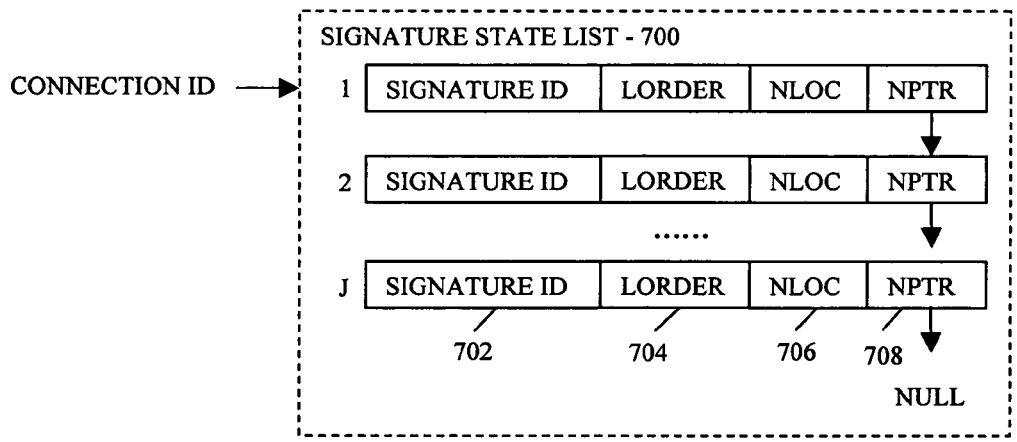
FIG. 7 illustrates a data structure of a signature state list for a particular string field.

In one implementation, as illustrated in FIG. 7, the signature state table 188 can be implemented as one or more signature state lists 700. Each signature state list 700 can dynamically store signature states for all the substrings of all the variable-size string signatures identified for a string field of a particular connection. Each element of the signature state list 700 includes a signature ID 702, a last string order ("lorder") 704, a next string location ("nloc") 706, and a next element pointer ("nptr") 708. The signature ID 702 is an identification of a particular variable-size string signature. The lorder 704 is an order of a particular substring given by a last string ID for the particular variable-size string signature. The nloc 706 is a valid range for the substring given by a next string ID for the particular variable-size string signature.

In one implementation, each string field of each individual connection has a signature state list 700. Typically, at each period of time, for each individual connection, only one string field is being scanned and there is only one signature state list 700. The signature state list 700 can include an entire valid history of all matched substrings of all the variable-size string signatures for a string field of a particular connection.

The signature state list 700 can be dynamic. In one implementation, a new element can be inserted into a signature state list 700 for a string field of a particular connection, if the substring given by the string ID is a first substring of a variable-size string signature, where the order 604=1, and there is no existing element for the particular variable-size string signature. An element of the signature state list 700 scan be deleted, if a current string header location is not within a valid range specified by the nloc 706 or if a timeout occurs. An element of the signature state list 700 can also be deleted after a matched variable-size string signature is found based on the element. All the elements of the signature state list 700 for a string field of a particular connection can be deleted at the end of the string field.

Referring back to FIGS. 1 and 6, in one implementation, the signature rule lookup engine 182 receives a string ID from the fixed-size signature search engine 160. The signature rule lookup engine 182 searches through the entire signature rule list 600 identified by the string ID and sends information (e.g., {signature ID 602, order 604, last 606, dis info 610}) from each element of the signature rule list 600, along with information from the fixed-size signature search engine 160 (e.g., {string header location, string size, connection ID, string field ID}), to the signature state verifier 184 sequentially, until a tail of the string rule list 600 (i.e., where the nptr 608 has a NULL value) is reached.

For each element in the signature rule lookup engine 182, the signature state verifier 184 searches through the signature state list 700 pointed to by the connection ID. For each element of the signature state list 700, if the signature ID 602 and signature ID 702 are the same, the order 604 has a value equal to the value of the lorder 704+1, and the string header location is within the valid range specified by the nloc 706, a match is found. For each matched element of the signature state list 700, the signature ID 602 is returned and the element is deleted, when the last flag 606 has a value of 1; otherwise, the element is updated as the lorder 704 having a value equal to the value of the order 604 and the nloc 706 having a value equal to a sum of the string header location, the string size, and the value of the dis info 610. No action is performed on the element when a match is not found.

In one implementation, the signature state list 700 can perform the scanning when the signature state list 700 is short and only one string field is being scanned for a particular connection at a particular time. However, if the signature state list 700 is long or multiple string fields are scanned for a particular connection at a particular time, other search data structure can be used for the signature state table 188. In one implementation, the signature state table 188 can be a signature state bloom filter or a signature state hash table, similar to the data structure in FIGS. 2A-2C. The hash key of the signature state bloom filter or a signature state hash table is a 3-tuple {connection ID, string field ID, signature ID}. In one implementation, the string field ID is not used when only one string field is being scanned for each connection at a particular time.

Figure 8:
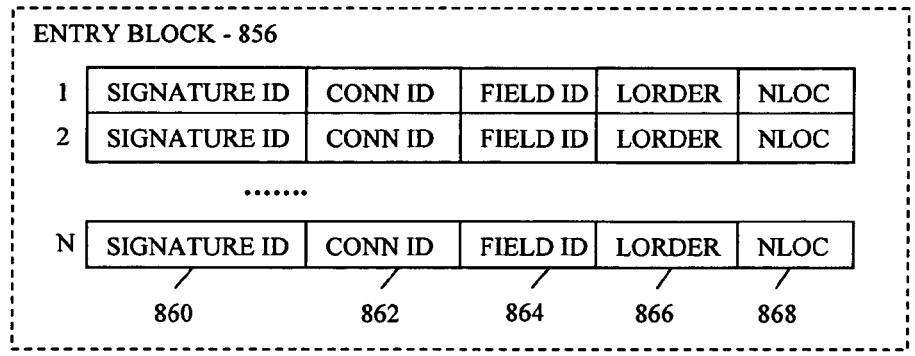
FIG. 8 illustrates a data structure of an entry block indexed by a signature state bloom filter or hash table.

In one implementation, a data structure replaces the entry block 256 of FIGS. 2A-2C with a new entry block 856, as illustrated in FIG. 8. Each element of the entry block 856 includes a signature ID 860, a connection ID ("conn ID") 862, a field ID 864, a last string order ("lorder") 866, and a next string location ("nloc") 868. The hash key 3-tuple {signature ID 860, conn ID 862, field ID 864}, can be stored to resolve any hash collisions, while the lorder 866 and nloc 868 have the same definition as the lorder 704 and nloc 706 described above with respect to FIG. 7. At each entry of the entry block 856, if an original key is the same, order 604 has a value equal to the value of the lorder 866+1, and the string header location is within a valid range specified by the nloc 868, a match is found. The signature ID 602 can be returned and the element can be deleted when a matched entry is found and the last 606 has a value of 1. When a matched entry is found, but the last flag 606 has a value of 0, the entry can be updated as lorder 866 has a value equal to the value of the order 604 and the nloc 868 has a value equal to a sum of the string header location, the string size, and the value of the dis info 610. If no match is found, the element can remain unchanged.

Scan System Design and Performance

In one implementation, a speed of the fast string signature scan engine 100 can be limited by a speed of the fingerprint scan engine 140, for example, if the false positive is sufficient small and the later scanning stages are properly designed. When the fingerprints are scanned both as a whole and sequentially on different lengths, the speed of the fingerprint scan engine 140 can depend on a combination of the scan step size, the number of lengths of fingerprints, and the clock rate. In one implementation the speed of the scan engine 100 is substantially (s/m)*R, where the s is the scan step size, the m is the number of lengths of fingerprints, and the R is the clock rate. For example, if the scan step size is 8 bytes, the fingerprint lengths are 4, 8, 16, and 32 bytes, and the clock rate is 250 MHz, the scan speed of a single scan engine 100 is substantially (8/4)*250 MB/s=4 Gbits/s.

In another implementation, the fingerprints are scanned in segments in parallel and synthesized sequentially for the at-least-one match and the segment size is the same as the scan step size, the scan speed of a single scan engine 100 is substantially s*R. In one implementation, the scan engine 100 can scan a string field at 16 Gbps when s and R have the same value. Additionally, the speed can be further increased when the fingerprints are scanned in segments and in parallel.

In one implementation, the fingerprint architecture and parameters can be selected based on a string signature scan speed, sizes of the fixed-size signatures or fixed-size substrings of variable-size signatures, similarity among the signatures or signature substrings, and the size of the signature database, to ensure that the fingerprint scan engine 140, the fixed-size signature search engine 160, and the fixed-size signature search engine 180 can meet a particular scan system's requirements. For example, the scan step size can be selected based on the system requirements. As shown in TABLE 1, the larger the scan step size, the faster the scanning is performed by the fast string signature scan engine 100. However, there is also an increase in the minimum size of fixed-size string signature and signature substrings, as well as the more the insertions and deletions. Large scan step size can also limit the choices of the fingerprints for each signature and increasing the probability of collisions and false positive results.

TABLE 1

SCAN STEP SIZE SELECTION

| SCAN STEP SIZE | SPEEDUP FACTOR | MINIMUM SIZE OF FIXED-SIZE SIGNATURE | NUMBER OF INSERTIONS AND DELETIONS |
|---|---|---|---|
| 1 | 1 | 1 | 1 |
| 2 | 2 | 3 | 2 |
| 3 | 3 | 5 | 3 |
| N | n | 2*n–1 | N |

Additionally, the scan step size and thus the scanning speed can be particularly limited by the minimum size of the fixed-size string signatures and signature substrings. In one implementation, to avoid scanning short string signatures separately, the scan step size can be selected based on the minimum size of the fixed-size string signatures or signature substrings according to TABLE 1.

In another implementation, to increase the scan speed by multiple times, a larger scan step size can be selected. The string signatures that are shorter than what can be scanned by the scan step size can then be scanned separately, for example, by using scanning methods described above or any other scan method. Increasing the scan step size can be effective when only a small number of fixed-size string signatures or signature substrings are short.

In another implementation, the number of engines in different pipelining stages can be different. The engines can be selected according to the particular system's requirements. For example, for a particular system, the configuration can use one preprocessing engine 120, four fingerprint scan engines 140, one fixed-size signature search engine 160, and two variable-size signature search engines 180.

In another implementation, one or more engines in different pipelining stages can be replaced by other scanning methods. For example, a content addressable memory (CAM) is used for scanning the shadow of the fingerprint as the fingerprint scan engine 140 does, while a fixed-size signature search engine 160 and a variable-size signature search engines 180 are used for further signature scanning.

Other implementations can be performed on other strings of data. For example, biological system such as a sequence of genetic code can be used as a string field. Fingerprints describing specific genetic sequences can be used to identify particular genetic sequences from a string field of genetic data. For example, particular genes can be identified by a particular fingerprint and scanned for using the scanning engine.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

Figure 9:
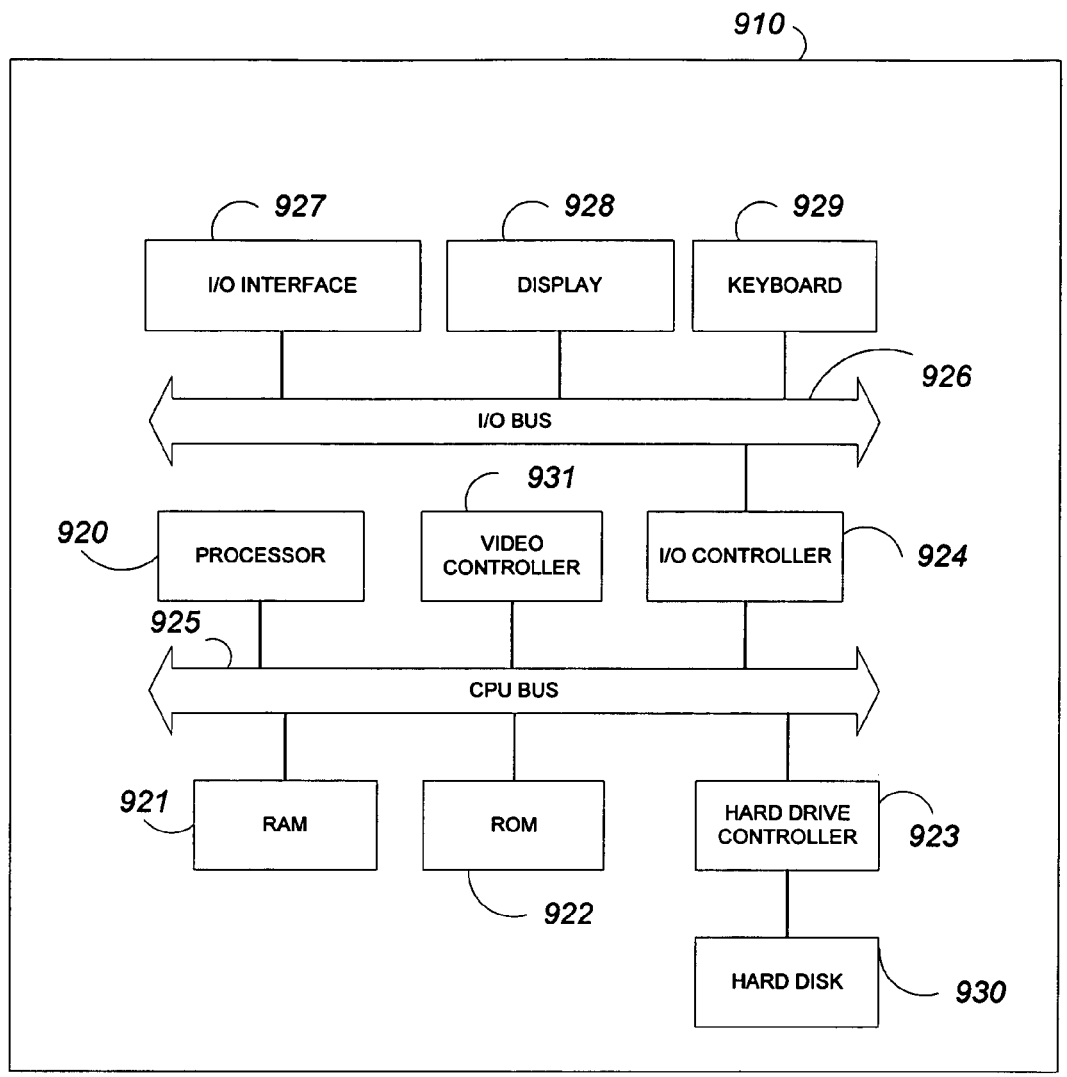
FIG. 9 illustrates a computer system.

The computing system can include clients and servers. A client and server are generally remote from each other and typically interact through a communication network. The relationship of client and server arises by virtue of computer programs running on the respective computers and having a client-server relationship to each other. An example of one such type of computer is shown in FIG. 9, which shows a block diagram of a programmable processing system (system) 910 suitable for implementing or performing the apparatus or methods of the invention. The system 910 includes a processor 920, a random access memory (RAM) 921, a program memory 922 (for example, a writable read-only memory (ROM) such as a flash ROM), a hard drive controller 923, a video controller 931, and an input/output (I/O) controller 924 coupled by a processor (CPU) bus 925. The system 910 can be preprogrammed, in ROM, for example, or it can be programmed (and reprogrammed) by loading a program from another source (for example, from a floppy disk, a CD-ROM, or another computer).

The hard drive controller 923 is coupled to a hard disk 930 suitable for storing executable computer programs.

The I/O controller 924 is coupled by means of an I/O bus 926 to an I/O interface 927.

The I/O interface 927 receives and transmits data (e.g., stills, pictures, movies, and animations for importing into a composition) in analog or digital form over communication links such as a serial link, local area network, wireless link, and parallel link. Also coupled to the I/O bus 926 is a display 928 and a keyboard 929. Alternatively, separate connections (separate buses) can be used for the I/O interface 927, display 928 and keyboard 929.

The invention has been described in terms of particular embodiments. Other embodiments are within the scope of the following claims. For example, the steps of the invention can be performed in a different order and still achieve desirable results.

What is claimed is:

1. A method for signature scanning for one or more fully specified signatures, comprising:

processing one or more signatures into one or more formats that include a plurality of fingerprints and one or more follow-on search data structures for each signature, each successive fingerprint of a particular signature having a first basic unit in a scanning direction that is shifted one or more units from the previous fingerprint of the particular signature such that the number of shifted fingerprints is equal to a step size for a signature scanning operation and the particular signature is identifiable at any location within any string fields to be scanned, the step size used to identify a plurality of locations to scan in one or more string fields, where each fingerprint of the plurality of fingerprints includes one or more fragments of the particular signature, the one or more fragments having particular locations anywhere within the particular signature;

receiving a particular string field comprising a string of data values;

identifying any signatures included in the particular string field including scanning the particular string field for the plurality of fingerprints associated with the one or more signatures, where the scanning includes scanning for the plurality of fingerprints including two or more fingerprints in parallel for each step size, and searching the particular string field for the follow-on search data structures only at the locations where one or more fingerprints are found; and outputting any identified signatures in the particular string field.

2. The method of claim 1, where the fingerprints are selected such that their lengths are limited to a length list that covers one or more lengths within one or more ranges of lengths providing multiple resolution fingerprint scanning.

3. The method of claim 2, where each of the lengths of the fingerprints is a multiple of the scan step size.

4. The method of claim 1, further comprising:

decomposing a fingerprint into one or more fingerprint segments;

scanning the particular string field;

identifying one or more fingerprint segments; and synthesizing the identified fingerprint segments into one or more fingerprint matches.

5. The method of claim 4, where all fingerprint segments have a same length and the scan step size is a multiple of the length.

6. The method of claim 1, further comprising scanning for the fingerprints using one or more hash tables or bloom filters.

7. The method of claim 6, where scanning for the fingerprints further comprises using one or more of:

a hash value de-multiplexer; and a fingerprint length de-multiplexer.

8. The method of claim 1, further comprising:
constructing a differential search structure using one or more distinct basic units among a plurality of string signatures; and
searching for one or more signatures differentially.

9. A signature scanning system for one or more fully specified signatures, comprising:
a machine-readable storage device including a computer program product; and
one or more processors operable to execute the computer program product, and perform operations including providing one or more modules including:
a signature pre-processing module operable to process one or more signatures into one or more formats that include a plurality of fingerprints and one or more follow-on search data structures for each signature, each successive fingerprint of a particular signature having a first basic unit in a scanning direction that is shifted one or more units from the previous fingerprint of the particular signature such that the number of shifted fingerprints is equal to a step size for a signature scanning operation and the particular signature is identifiable at any location within any string fields to be scanned, the step size used to identify a plurality of locations to scan in one or more string fields, where each fingerprint of the plurality of fingerprints includes one or more fragments of the particular signature, the one or more fragments having particular locations anywhere within the particular signature;
a scan pre-processing engine operable to process an input string field comprising a string of data values into a format of the one or more formats;
a fingerprint scan engine operable to identify fingerprints associated with the one or more signatures on the input string field, the identifying including scanning the input string field, where the scanning includes scanning for the fingerprints including two or more fingerprints in parallel for each step size; and
a signature search engine operable to identify corresponding signatures for the identified fingerprints.

10. The system of claim 9, the signature pre-processing module being operable to construct a signature database, comprising:
a fingerprint database; and
a signature database.

11. The system of claim 9, the signature pre-processing module being operable to decompose one or more fingerprints into a plurality of fingerprint segments and store synthesis information for said each fingerprint segment of the plurality of fingerprint segments in a fingerprint database.

12. The system of claim 9, the signature pre-processing module being operable to construct a differential search structure using one or more distinct basic unit among a plurality of signatures.

13. The system of claim 9, the scan pre-processing engine being operable to process a string field in a plurality of blocks, the processing including decoding, normalizing, and translating, each block of the plurality of blocks comprising:
a fingerprint scan region for performing a fingerprint scan and for signature search;
a front signature search region in advance of the fingerprint scan region for signature search; and
a rear signature search region behind the fingerprint scan region for signature search.

14. The system of claim 9, the fingerprint scan engine being operable to detect one or more fingerprints using one or more hash tables or bloom filters.

15. The system of claim 9, the fingerprint scan engine further comprising:
a fingerprint scan controller;
a fingerprint hash engine;
a fingerprint search engine;
a fingerprint synthesis engine; and
a fingerprint database.

16. The system of claim 15, the fingerprint synthesis engine being operable to synthesize a plurality of fingerprint segments into one or more fingerprint matches if there is at least one matched fingerprint.

17. The system of claim 15, the fingerprint hash engine being operable to compute a plurality of hash values for a plurality of hash keys sequentially in non-overlapping prefix segments using a sequential hash function.

18. The system of claim 9, the signature search engine further comprising:
a signature finder;
a signature verifier; and
a signature database.

19. The system of claim 18, wherein the signature finder is operable to search for one or more signatures differentially.

20. The system of claim 9, where one or more engines includes one or more of content addressable memories (CAM) and finite automata (FA).

21. The system of claim 9, where the fingerprint scan engine includes one or more content addressable memories (CAM).

22. A method for signature scanning for one or more signatures that at least one of them is not fully specified, comprising:
processing the one or more signatures into one or more formats that include one or more fingerprints for each fixed-size signature or each fixed-size portion of each variable-size signature and one or more follow-on search data structures, each successive fingerprint of a particular signature having a first basic unit in a scanning direction that is shifted one or more units from the previous fingerprint of the particular signature such that the number of shifted fingerprints is equal to a step size for a signature scanning operation and the particular signature is identifiable at any location within any string fields to be scanned, the step size used to identify one or more locations to scan in one or more string fields, where each fingerprint of the one or more fingerprints includes one or more fragments of the particular signature, the one or more fragments having particular locations within the particular signature and that are fully specified either originally or after mapping them into one or more shadow spaces where the shadow spaces are spaces that correspond to a generalized format from the original space where the shadow spaces are spaces that introduce some ambiguity to the original space such that a single fingerprint in a particular shadow space corresponds to one or more fingerprints in the original space;
receiving a particular string field including a string of data values;
identifying signatures included in the particular string field including scanning the particular string field in an original space when all of the one or more fingerprints are fully specified in the original space the scanning including scanning for one or more fingerprints for each step size, scanning the particular string field in each of the one or more shadow spaces that have at least one fingerprint the scanning including scanning for one or more fingerprints for each step size, and then verifying the identified fingerprints in the original space at the scan location where one or more identified fingerprints are found in at least one of the one or more shadow spaces for the one or more fingerprints associated with one or more signatures in the particular string field, and searching the particular string field for the follow-on search data structures only at the scan locations where one or more fingerprints are found; and outputting any identified signatures in the particular string field.

23. The method of claim 22, wherein scanning the particular string field further comprises:

identifying a match between a fingerprint and an associated signature;

determining if the associated signature corresponds to a fixed-size signature or a fixed-size signature substring of a variable-size signature when there is at least one variable-size signature in the one or more signatures; and synthesizing fixed-size signature substrings of a variable-size signature to identify a variable-sized signature when there is at least one variable-size signature in the one or more signatures.

24. The method of claim 22, further comprising:

decomposing a signature containing at least one variable-size symbol into a plurality of fixed-size signature substrings and one or more variable-size signature substrings.

25. The method of claim 22, further comprising:

encoding one or more fragments of a signature with one or more mask bits and store the one or more mask bits with the one or more fragments for a signature.

26. The method of claim 22, wherein the fingerprints are selected such that their lengths are limited to a length list that covers one or more lengths within one or more ranges of lengths providing multiple resolution fingerprint scanning.

27. The method of claim 26, where each of the lengths of the fingerprints is a multiple of the scan step size.

28. The method of claim 22, further comprising:

normalizing the particular string field, including one or more of:

decompressing the particular string field if the particular string filed is in a compressed format;

decoding the particular string field if the particular string field is encoded; and removing unnecessary string data.

29. The method of claim 22, further comprising:

decomposing a fingerprint into one or more fingerprint segments;

scanning the particular string field;

identifying one or more fingerprint segments; and synthesizing the identified fingerprint segments into one or more fingerprint matches.

30. The method of claim 29, where all fingerprint segments have a same length and the scan step size is a multiple of the length.

31. The method of claim 22, wherein scanning for the fingerprints using one or more hash tables or bloom filters.

32. The method of claim 31, where scanning for the fingerprints further comprises using one or more of a hash value de-multiplexer; and a fingerprint length de-multiplexer.

33. The method of claim 22, further comprising:

constructing a differential search structure using one or more distinct basic units among a plurality of string signatures; and searching for one or more signatures differentially.

34. The method of claim 22, wherein a shadow space is a space after changing all the characters in both upper and lower cases in an original space to a same case or all numerical digits from 0 to 9 in an original space to a same digit or both "space" and "-" in an original space to one of a "space" or "-".

35. The method of claim 26, where a plurality of the fingerprints are selected for each fixed-sized signature or each fixed-size portion of each variable-size signature based on a cost function of a particular signature scanning system.

36. The method of claim 22, where a plurality of the fingerprints for each fixed-sized signature or each fixed-size portion of each variable-size signature are selected along with the selection of one or more shadow spaces.

37. The method of claim 22, where the number of the one or more shadow spaces are selected for a maximum scanning speed.

38. A signature scanning system for one or more signatures where at least one of the one or more signatures is not fully specified, the system comprising:

a machine-readable storage device including a computer program product; and one or more processors operable to execute the computer program product, and perform operations including providing one or more modules including:

a signature pre-processing module operable to process signatures into one or more formats that include one or more fingerprints for each fixed-size signature or each fixed-size portion of a variable-size signature and one or more follow-on search data structures, each successive fingerprint of a particular signature having a first basic unit in a scanning direction that is shifted one or more units from the previous fingerprint of the particular signature such that the number of shifted fingerprints is equal to a step size for a signature scanning operation and the particular signature is identifiable at any location within any string fields to be scanned, the step size used to identify one or more locations to scan in one or more string fields, where each fingerprint includes one or more fragments of the particular signature, the one or more fragments having particular locations within the particular signature that are fully specified either originally or after mapping them into one or more shadow spaces where the shadow spaces are spaces that correspond to a generalized format from the original space where the shadow spaces are spaces that introduce some ambiguity to the original space such that a single fingerprint in a particular shadow space corresponds to one or more fingerprints in the original space;

a scan pre-processing engine operable to process an input string field including a string of data values into one or more formats for a scan;

a fingerprint scan engine operable to identify fingerprints associated with one or more signatures on the input string field, the identifying including scanning the input string field, where the scanning includes scanning for one or more fingerprints for each step size;

a fixed-size signature search engine operable to identify fixed-size signatures or fixed-size substrings of variable-size signatures for the identified fingerprints; and a variable-size signature search engine operable to identify variable-size signatures when there is at least one variable-size signature in the signature scanning system.

39. The system of claim 38, the signature pre-processing module being operable to construct a signature database, comprising:

a fingerprint database;

a fixed-size signature database; and a variable-size signature database when there is at least one variable-size signature in the signature scanning system.

40. The system of claim 38, the signature pre-processing module being operable to decompose each of one or more fingerprints into one or more fingerprint segments and store synthesis information for the plurality of fingerprint segments in a fingerprint database.

41. The system of claim 38, the signature pre-processing module being operable to select one or more shadow spaces and translate one or more fingerprints into the one or more of the selected shadow spaces for scanning.

42. The system of claim 38, the signature pre-processing module being operable to encode one or more fragments of a signature with one or more mask bits and store the one or more mask bits with the one or more fragments for a complex signatures.

43. The system of claim 38, the signature pre-processing module being operable to construct a differential search structure using one or more distinct basic units among a plurality of signatures.

44. The system of claim 38, the scan pre-processing engine being operable to process a string field in a plurality of blocks, the processing including one or more of feeding, decoding, normalizing, and translating, each block of the plurality of blocks comprising:
- a fingerprint scan region for performing a fingerprint scan and for signature search;
- a front signature search region in advance of the fingerprint scan region for signature search; and
- a rear signature search region behind the fingerprint scan region for signature search.

45. The system of claim 38, the fingerprint scan engine being operable to detect one or more fingerprints using one or more hash tables or bloom filters.

46. The system of claim 45, where the fingerprint scan engine further comprises one or more of:
- a hash value de-multiplexer; and
- a fingerprint length de-multiplexer.

47. The system of claim 38, the scan pre-processing engine further comprising:
- a scan feeder,
- a shadow translator;
- a string memory; and
- a shadow memory.

48. The system of claim 38, the fingerprint scan engine further comprising:
- a fingerprint scan controller;
- a fingerprint hash engine;
- a fingerprint search engine;
- a fingerprint synthesis engine; and
- a fingerprint database.

49. The system of claim 48, the fingerprint synthesis engine being operable to synthesize a plurality of fingerprint segments into one or more fingerprint matches if there is at least one matched fingerprint.

50. The system of claim 48, the fingerprint hash engine being operable to compute a plurality of hash values for a plurality of hash keys sequentially in non-overlapping prefix segments using a sequential hash function.

51. The system of claim 38, the fixed-size signature search engine further comprising:
- a signature finder;
- a signature verifier; and
- a fixed-size signature database.

52. The system of claim 51, wherein the signature finder and the signature verifier are operable to compare a plurality of masked fragments of a signature using a signature unit comparator and a signature segment comparator to identify one or more fixed-size signatures.

53. The system of claim 51, wherein the signature finder is operable to search for one or more signatures differentially.

54. The system of claim 38, the variable-size signature search engine further comprising:
- a signature rule lookup engine;
- a signature state verifier;
- a signature rule database; and
- a signature state table.

55. The system of claim 38, a plurality of the fingerprints are selected for each fixed-sized signature or each fixed-size portion of each variable-size signature based on a cost function of the system.

56. The system of claim 38, where one or more engines includes one or more of content addressable memories (CAM) and finite automata (FA).

57. The system of claim 38, where the fingerprint scan engine includes one or more content addressable memories (CAM).

* * * * *